(12) United States Patent
Bae et al.

(10) Patent No.: US 12,266,865 B2
(45) Date of Patent: Apr. 1, 2025

(54) WAVELENGTH BASED V2X ANTENNA

(71) Applicant: Motional AD LLC, Boston, MA (US)

(72) Inventors: Jungnam Bae, Pittsburgh, PA (US); Junho Park, Seven Fields, PA (US)

(73) Assignee: Motional AD LLC, Boston, MA (US)

( * ) Notice: Subject to any disclaimer, the term of this patent is extended or adjusted under 35 U.S.C. 154(b) by 36 days.

(21) Appl. No.: 17/940,011

(22) Filed: Sep. 8, 2022

(65) Prior Publication Data

US 2024/0088576 A1    Mar. 14, 2024

(51) Int. Cl.
  *H01Q 21/30*  (2006.01)
  *H01Q 1/32*   (2006.01)
  *H04B 17/309* (2015.01)

(52) U.S. Cl.
  CPC ............... *H01Q 21/30* (2013.01); *H01Q 1/32* (2013.01); *H04B 17/309* (2015.01)

(58) Field of Classification Search
  CPC ............. H01Q 21/30; H01Q 1/27; H01Q 1/32
  See application file for complete search history.

(56) References Cited

U.S. PATENT DOCUMENTS

| | | | | |
|---|---|---|---|---|
| 10,446,930 | B1 * | 10/2019 | Gommé | H01Q 15/0053 |
| 2002/0111149 | A1 * | 8/2002 | Shoki | H01Q 21/30 |
| | | | | 455/277.1 |
| 2003/0117328 | A1 | 6/2003 | Sievenpiper et al. | |
| 2015/0311582 | A1 | 10/2015 | Hu et al. | |
| 2015/0380807 | A1 * | 12/2015 | Owen | H01Q 21/29 |
| | | | | 342/367 |
| 2017/0054204 | A1 * | 2/2017 | Changalvala | H01Q 1/42 |
| 2017/0101056 | A1 * | 4/2017 | Park | G08G 1/162 |
| 2018/0366838 | A1 * | 12/2018 | Kim | H04W 4/40 |
| 2019/0097315 | A1 | 3/2019 | Chun | |
| 2019/0267702 | A1 * | 8/2019 | Shiroki | H01Q 21/28 |
| 2020/0037128 | A1 * | 1/2020 | Lu | H04L 27/2627 |
| 2020/0077279 | A1 * | 3/2020 | Foerster | H04B 7/0408 |
| 2020/0136768 | A1 * | 4/2020 | Bae | H04L 5/0085 |
| 2020/0185818 | A1 | 6/2020 | Kim et al. | |
| 2020/0194882 | A1 * | 6/2020 | Kim | H01Q 1/3208 |
| 2020/0247200 | A1 * | 8/2020 | Ferrer | H04W 4/44 |
| 2021/0061292 | A1 * | 3/2021 | Bae | G06F 8/65 |
| 2021/0152209 | A1 * | 5/2021 | Baek | B60R 16/023 |
| 2021/0337426 | A1 * | 10/2021 | Lee | H04W 74/0816 |
| 2022/0039080 | A1 * | 2/2022 | Khoryaev | H04W 4/40 |
| 2022/0052724 | A1 * | 2/2022 | Kim | H04B 1/3822 |
| 2022/0303743 | A1 * | 9/2022 | Lansford | B60D 1/62 |
| 2022/0352622 | A1 * | 11/2022 | Choudhury | H01Q 1/3275 |
| 2022/0384955 | A1 * | 12/2022 | Kim | H01Q 5/307 |
| 2023/0023379 | A1 * | 1/2023 | Möhlmann | H04B 7/04 |

(Continued)

OTHER PUBLICATIONS

International Search Report and Written Opinion received for PCT Application No. PCT/US2023/073511, mailed Dec. 1, 2023.

(Continued)

*Primary Examiner* — Jason M Crawford
(74) *Attorney, Agent, or Firm* — Knobbe, Martens, Olson & Bear, LLP

(57) ABSTRACT

Provided are wavelength based V2X antennas, and related antenna systems and method, which can include a first antenna having a first wavelength and a second antenna having a second antenna. Some antenna systems control a wavelength of a signal for transmission using one of the first antenna and the second antenna.

19 Claims, 11 Drawing Sheets

(56) References Cited

U.S. PATENT DOCUMENTS

| | | | | |
|---|---|---|---|---|
| 2023/0051251 A1* | 2/2023 | Hwang | ............... | G01S 5/12 |
| 2023/0068609 A1* | 3/2023 | Donaldson | ............ | H04W 4/80 |
| 2023/0099552 A1* | 3/2023 | Kim | ............... | H01Q 1/48 |
| | | | | 375/267 |
| 2023/0140472 A1* | 5/2023 | Lee | ............... | H01Q 1/3275 |
| | | | | 343/702 |
| 2023/0198553 A1* | 6/2023 | Kim | ............... | H01Q 5/307 |
| | | | | 370/329 |
| 2024/0079795 A1* | 3/2024 | Bae | ............... | H01Q 1/521 |
| 2024/0088576 A1* | 3/2024 | Bae | ............... | H04B 17/309 |

OTHER PUBLICATIONS

SAE On-Road Automated Vehicle Standards Committee, "SAE International's Standard J3016: Taxonomy and Definitions for Terms Related to Driving Automation Systems for On-Road Motor Vehicles", Jun. 2018, in 35 pages.

\* cited by examiner

WAVELENGTH BASED V2X ANTENNA

BACKGROUND

Autonomous driving requires large amounts of data usage for operation, such as for wireless communications along the lines of Long Term Evolution (LTE), 5G, and Vehicle-To-Everything (V2X). Vehicle-to-everything (V2X) communication systems are particularly important communication systems providing for robust and reliable performance of an autonomous vehicle. V2X communication includes several different types of communications, such as vehicle-to-infrastructure (V2I), vehicle-to-vehicle (V2V), vehicle-to-pedestrian (V2P), and vehicle-to-network (V2N) communications. In general, V2X antennas in autonomous vehicles have omni-directional characteristics to communicate with vehicles, infrastructure, etc. However, an omni-direction signal is not an optimum beam pattern for different types of communication scenarios (e.g., V2I, V2V, V2N).

In some instances, beamforming has been used to avoid the issues with omni-directionality. However, beamforming has numerous disadvantages for employing into vehicle due to its complex structure. For example, to achieve a precise beam pattern, beamforming requires many antennas and has complex controller structure. Accordingly, beamforming requires increased space and consumes excessive power, which are burdensome for an autonomous vehicle.

DETAILED DESCRIPTION

Figure 1:
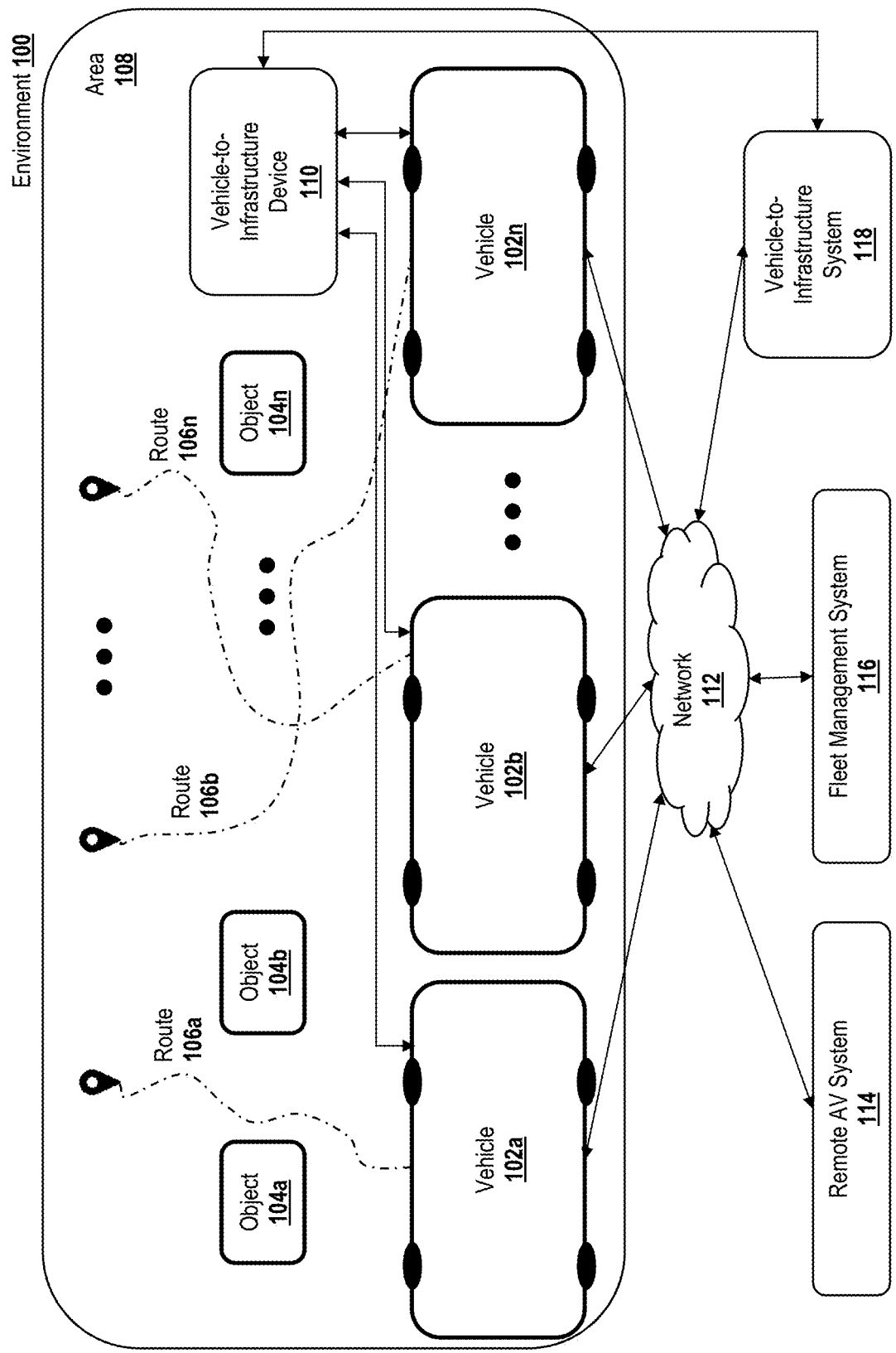
FIG. 1 is an example environment in which a vehicle including one or more components of an autonomous system can be implemented.

In the following description numerous specific details are set forth in order to provide a thorough understanding of the present disclosure for the purposes of explanation. It will be apparent, however, that the embodiments described by the present disclosure can be practiced without these specific details. In some instances, well-known structures and devices are illustrated in block diagram form in order to avoid unnecessarily obscuring aspects of the present disclosure.

Specific arrangements or orderings of schematic elements, such as those representing systems, devices, modules, instruction blocks, data elements, and/or the like are illustrated in the drawings for ease of description. However, it will be understood by those skilled in the art that the specific ordering or arrangement of the schematic elements in the drawings is not meant to imply that a particular order or sequence of processing, or separation of processes, is required unless explicitly described as such. Further, the inclusion of a schematic element in a drawing is not meant to imply that such element is required in all embodiments or that the features represented by such element may not be included in or combined with other elements in some embodiments unless explicitly described as such.

Further, where connecting elements such as solid or dashed lines or arrows are used in the drawings to illustrate a connection, relationship, or association between or among two or more other schematic elements, the absence of any such connecting elements is not meant to imply that no connection, relationship, or association can exist. In other words, some connections, relationships, or associations between elements are not illustrated in the drawings so as not to obscure the disclosure. In addition, for ease of illustration, a single connecting element can be used to represent multiple connections, relationships or associations between elements. For example, where a connecting element represents communication of signals, data, or instructions (e.g., "software instructions"), it should be understood by those skilled in the art that such element can represent one or multiple signal paths (e.g., a bus), as may be needed, to affect the communication.

Although the terms first, second, third, and/or the like are used to describe various elements, these elements should not be limited by these terms. The terms first, second, third, and/or the like are used only to distinguish one element from another. For example, a first contact could be termed a second contact and, similarly, a second contact could be termed a first contact without departing from the scope of the described embodiments. The first contact and the second contact are both contacts, but they are not the same contact.

The terminology used in the description of the various described embodiments herein is included for the purpose of describing particular embodiments only and is not intended to be limiting. As used in the description of the various described embodiments and the appended claims, the singular forms "a," "an" and "the" are intended to include the plural forms as well and can be used interchangeably with "one or more" or "at least one," unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this description specify the presence of stated features, integers, steps, operations, elements, and/or components, but do not preclude the presence or addition of one or more other features, integers, steps, operations, elements, components, and/or groups thereof.

As used herein, the terms "communication" and "communicate" refer to at least one of the reception, receipt, transmission, transfer, provision, and/or the like of information (or information represented by, for example, data, signals, messages, instructions, commands, and/or the like). For one unit (e.g., a device, a system, a component of a device or system, combinations thereof, and/or the like) to be in communication with another unit means that the one unit is able to directly or indirectly receive information from and/or send (e.g., transmit) information to the other unit. This may refer to a direct or indirect connection that is wired and/or wireless in nature. Additionally, two units may be in communication with each other even though the information transmitted may be modified, processed, relayed, and/or routed between the first and second unit. For example, a first unit may be in communication with a second unit even though the first unit passively receives information and does not actively transmit information to the second unit. As another example, a first unit may be in communication with a second unit if at least one intermediary unit (e.g., a third unit located between the first unit and the second unit) processes information received from the first unit and transmits the processed information to the second unit. In some embodiments, a message may refer to a network packet (e.g., a data packet and/or the like) that includes data.

As used herein, the term "if" is, optionally, construed to mean "when", "upon", "in response to determining," "in response to detecting," and/or the like, depending on the context. Similarly, the phrase "if it is determined" or "if [a stated condition or event] is detected" is, optionally, construed to mean "upon determining," "in response to determining," "upon detecting [the stated condition or event]," "in response to detecting [the stated condition or event]," and/or the like, depending on the context. Also, as used herein, the terms "has", "have", "having", or the like are intended to be open-ended terms. Further, the phrase "based on" is intended to mean "based at least partially on" unless explicitly stated otherwise.

"At least one," and "one or more" includes a function being performed by one element, a function being performed by more than one element, e.g., in a distributed fashion, several functions being performed by one element, several functions being performed by several elements, or any combination of the above."

Some embodiments of the present disclosure are described herein in connection with a threshold. As described herein, satisfying, such as meeting, a threshold can refer to a value being greater than the threshold, more than the threshold, higher than the threshold, greater than or equal to the threshold, less than the threshold, fewer than the threshold, lower than the threshold, less than or equal to the threshold, equal to the threshold, and/or the like.

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments can be practiced without these specific details. In other instances, well-known methods, procedures, components, circuits, and networks have not been described in detail so as not to unnecessarily obscure aspects of the embodiments.

General Overview

In some aspects and/or embodiments, systems, methods, and computer program products described herein include and/or implement an antenna system for improving signal quality, in particular for antenna systems having one or more V2X antennas. In one or more examples or embodiments, the V2X antenna includes a plurality of antennas configured at different wavelengths (e.g., configured for transmission and/or reception at different wavelengths). In some examples, the V2X antenna controls the wavelength of a signal for transmission by using one of the plurality of antennas.

By virtue of the implementation of systems, methods, and computer program products described herein, techniques for a wavelength based V2X antenna include improving signal performance of autonomous vehicles by using different wavelengths for different V2X communication. Advantageously, the techniques can provide improved connectivity performance while avoiding the use of complex beamforming schemes. In other words, the techniques can provide similar performance as conventional beamforming but using a simple and efficient structure into the vehicle. For example, the disclosed wavelength based V2X antenna is configured to optimize beam patterns (e.g., radiation patterns) for the different types of V2X communication, allowing for optimized and/or improved communication. In particular, the disclosure utilizes varying wavelengths, which can provide a similar performance with conventional beamforming within feasible structure employed into vehicle. For example, the disclosure provides optimized beam patterns according to different V2X scenarios, such as V2V and/or V2I scenarios. In one or more embodiments or examples, the disclosure allows for a change in a beam pattern of a V2X communication based on a control signal to provide a more optimized support for V2X communication scenarios.

Referring now to FIG. 1, illustrated is example environment 100 in which vehicles that include autonomous systems, as well as vehicles that do not, are operated. As illustrated, environment 100 includes vehicles 102a-102n, objects 104a-104n, routes 106a-106n, area 108, vehicle-to-infrastructure (V2I) device 110, network 112, remote autonomous vehicle (AV) system 114, fleet management system 116, and V2I system 118. Vehicles 102a-102n, vehicle-to-infrastructure (V2I) device 110, network 112, autonomous vehicle (AV) system 114, fleet management system 116, and V2I system 118 interconnect (e.g., establish a connection to communicate and/or the like) via wired connections, wireless connections, or a combination of wired or wireless connections. In some embodiments, objects 104a-104n interconnect with at least one of vehicles 102a-102n, vehicle-to-infrastructure (V2I) device 110, network 112, autonomous vehicle (AV) system 114, fleet management system 116, and V2I system 118 via wired connections, wireless connections, or a combination of wired or wireless connections.

Vehicles 102a-102n (referred to individually as vehicle 102 and collectively as vehicles 102) include at least one device configured to transport goods and/or people. In some embodiments, vehicles 102 are configured to be in communication with V2I device 110, remote AV system 114, fleet management system 116, and/or V2I system 118 via network 112. In some embodiments, vehicles 102 include cars, buses, trucks, trains, and/or the like. In some embodiments, vehicles 102 are the same as, or similar to, vehicles 200, described herein (see FIG. 2). In some embodiments, a vehicle 200 of a set of vehicles 200 is associated with an autonomous fleet manager. In some embodiments, vehicles 102 travel along respective routes 106a-106n (referred to individually as route 106 and collectively as routes 106), as described herein. In some embodiments, one or more vehicles 102 include an autonomous system (e.g., an autonomous system that is the same as or similar to autonomous system 202).

Objects 104a-104n (referred to individually as object 104 and collectively as objects 104) include, for example, at least one vehicle, at least one pedestrian, at least one cyclist, at least one structure (e.g., a building, a sign, a fire hydrant, etc.), and/or the like. Each object 104 is stationary (e.g., located at a fixed location for a period of time) or mobile (e.g., having a velocity and associated with at least one trajectory). In some embodiments, objects 104 are associated with corresponding locations in area 108.

Routes 106a-106n (referred to individually as route 106 and collectively as routes 106) are each associated with (e.g., prescribe) a sequence of actions (also known as a trajectory) connecting states along which an AV can navigate. Each route 106 starts at an initial state (e.g., a state that corresponds to a first spatiotemporal location, velocity, and/or the like) and ends at a final goal state (e.g., a state that corresponds to a second spatiotemporal location that is different from the first spatiotemporal location) or goal region (e.g. a subspace of acceptable states (e.g., terminal states)). In some embodiments, the first state includes a location at which an individual or individuals are to be picked-up by the AV and the second state or region includes a location or locations at which the individual or individuals picked-up by the AV are to be dropped-off. In some embodiments, routes 106 include a plurality of acceptable state sequences (e.g., a plurality of spatiotemporal location sequences), the plurality of state sequences associated with (e.g., defining) a plurality of trajectories. In an example, routes 106 include only high level actions or imprecise state locations, such as a series of connected roads dictating turning directions at roadway intersections. Additionally, or alternatively, routes 106 may include more precise actions or states such as, for example, specific target lanes or precise locations within the lane areas and targeted speed at those positions. In an example, routes 106 include a plurality of precise state sequences along the at least one high level action sequence with a limited lookahead horizon to reach intermediate goals, where the combination of successive iterations of limited horizon state sequences cumulatively correspond to a plurality of trajectories that collectively form the high level route to terminate at the final goal state or region.

Area 108 includes a physical area (e.g., a geographic region) within which vehicles 102 can navigate. In an example, area 108 includes at least one state (e.g., a country, a province, an individual state of a plurality of states included in a country, etc.), at least one portion of a state, at least one city, at least one portion of a city, etc. In some embodiments, area 108 includes at least one named thoroughfare (referred to herein as a "road") such as a highway, an interstate highway, a parkway, a city street, etc. Additionally, or alternatively, in some examples area 108 includes at least one unnamed road such as a driveway, a section of a parking lot, a section of a vacant and/or undeveloped lot, a dirt path, etc. In some embodiments, a road includes at least one lane (e.g., a portion of the road that can be traversed by vehicles 102). In an example, a road includes at least one lane associated with (e.g., identified based on) at least one lane marking.

Vehicle-to-Infrastructure (V2I) device 110 (sometimes referred to as a Vehicle-to-Infrastructure or Vehicle-to-Everything (V2X) device) includes at least one device configured to be in communication with vehicles 102 and/or V2I infrastructure system 118. In some embodiments, V2I device 110 is configured to be in communication with vehicles 102, remote AV system 114, fleet management system 116, and/or V2I system 118 via network 112. In some embodiments, V2I device 110 includes a radio frequency identification (RFID) device, signage, cameras (e.g., two-dimensional (2D) and/or three-dimensional (3D) cameras), lane markers, streetlights, parking meters, etc. In some embodiments, V2I device 110 is configured to communicate directly with vehicles 102. Additionally, or alternatively, in some embodiments V2I device 110 is configured to communicate with vehicles 102, remote AV system 114, and/or fleet management system 116 via V2I system 118. In some embodiments, V2I device 110 is configured to communicate with V2I system 118 via network 112.

Network 112 includes one or more wired and/or wireless networks. In an example, network 112 includes a cellular network (e.g., a long term evolution (LTE) network, a third generation (3G) network, a fourth generation (4G) network, a fifth generation (5G) network, a code division multiple access (CDMA) network, etc.), a public land mobile network (PLMN), a local area network (LAN), a wide area network (WAN), a metropolitan area network (MAN), a telephone network (e.g., the public switched telephone network (PSTN), a private network, an ad hoc network, an intranet, the Internet, a fiber optic-based network, a cloud computing network, etc., a combination of some or all of these networks, and/or the like.

Remote AV system 114 includes at least one device configured to be in communication with vehicles 102, V2I device 110, network 112, fleet management system 116, and/or V2I system 118 via network 112. In an example, remote AV system 114 includes a server, a group of servers, and/or other like devices. In some embodiments, remote AV system 114 is co-located with the fleet management system 116. In some embodiments, remote AV system 114 is involved in the installation of some or all of the components of a vehicle, including an autonomous system, an autonomous vehicle compute, software implemented by an autonomous vehicle compute, and/or the like. In some embodiments, remote AV system 114 maintains (e.g., updates and/or replaces) such components and/or software during the lifetime of the vehicle.

Fleet management system 116 includes at least one device configured to be in communication with vehicles 102, V2I device 110, remote AV system 114, and/or V2I infrastructure system 118. In an example, fleet management system 116 includes a server, a group of servers, and/or other like devices. In some embodiments, fleet management system 116 is associated with a ridesharing company (e.g., an organization that controls operation of multiple vehicles (e.g., vehicles that include autonomous systems and/or vehicles that do not include autonomous systems) and/or the like).

In some embodiments, V2I system 118 includes at least one device configured to be in communication with vehicles 102, V2I device 110, remote AV system 114, and/or fleet management system 116 via network 112. In some examples, V2I system 118 is configured to be in communication with V2I device 110 via a connection different from network 112. In some embodiments, V2I system 118 includes a server, a group of servers, and/or other like devices. In some embodiments, V2I system 118 is associated with a municipality or a private institution (e.g., a private institution that maintains V2I device 110 and/or the like).

Figure 10:
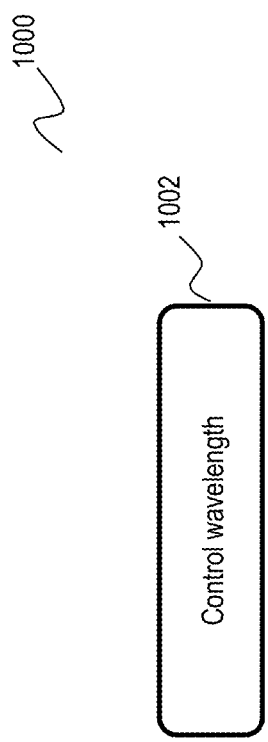
FIG. 10 is a flowchart of an example process for a wavelength based V2X antenna.

In some embodiments, device 300 is configured to execute software instructions of one or more steps of the disclosed method, as illustrated in FIG. 10.

The number and arrangement of elements illustrated in FIG. 1 are provided as an example. There can be additional elements, fewer elements, different elements, and/or differently arranged elements, than those illustrated in FIG. 1. Additionally, or alternatively, at least one element of environment 100 can perform one or more functions described as being performed by at least one different element of FIG. 1. Additionally, or alternatively, at least one set of elements of environment 100 can perform one or more functions described as being performed by at least one different set of elements of environment 100.

Figure 2:
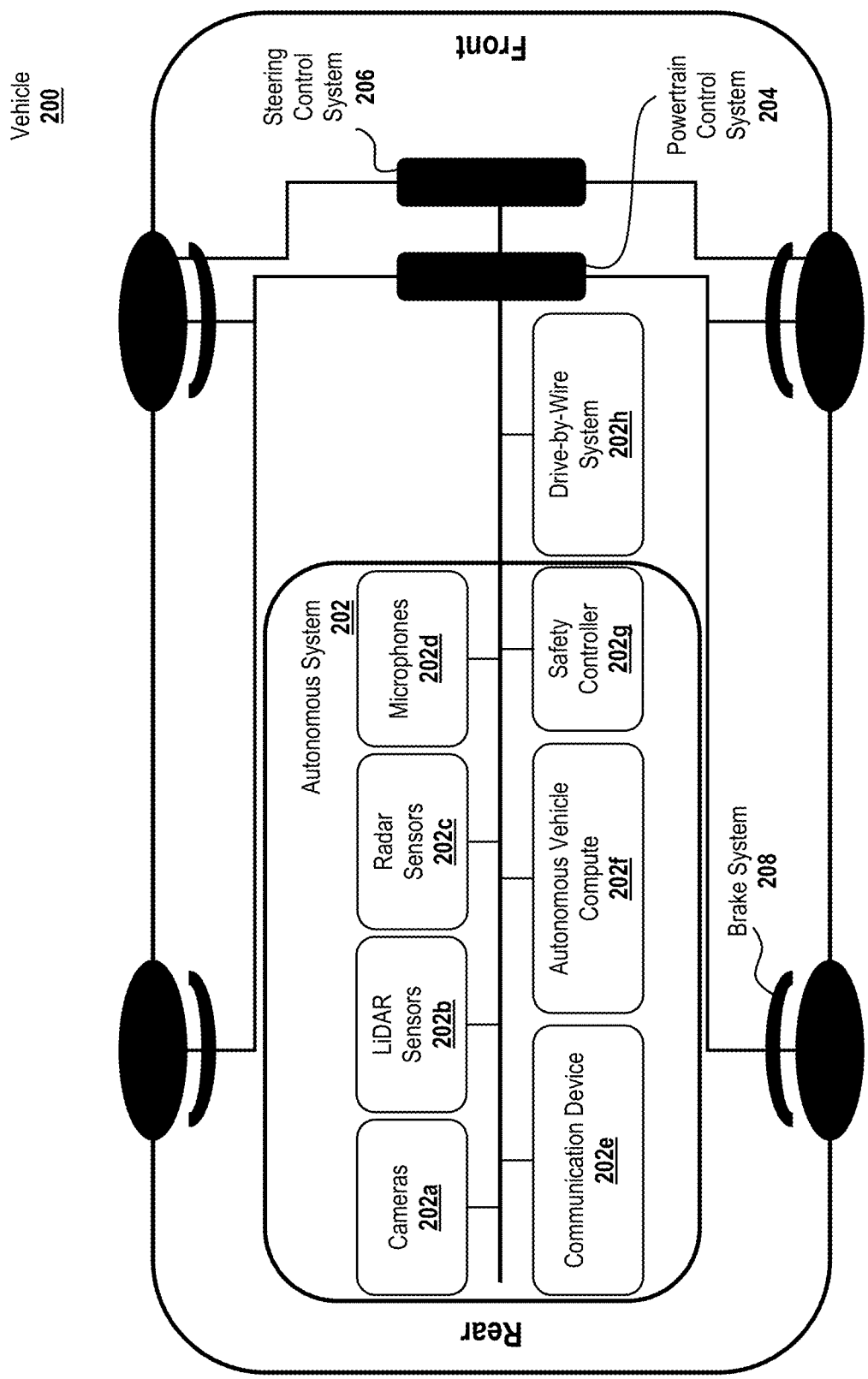
FIG. 2 is a diagram of one or more example systems of a vehicle including an autonomous system.

Referring now to FIG. 2, vehicle 200 (which may be the same as, or similar to vehicle 102 of FIG. 1) includes or is associated with autonomous system 202, powertrain control system 204, steering control system 206, and brake system 208. In some embodiments, vehicle 200 is the same as or similar to vehicle 102 (see FIG. 1). In some embodiments, autonomous system 202 is configured to confer vehicle 200 autonomous driving capability (e.g., implement at least one driving automation or maneuver-based function, feature, device, and/or the like that enable vehicle 200 to be partially or fully operated without human intervention including, without limitation, fully autonomous vehicles (e.g., vehicles that forego reliance on human intervention such as Level 5 ADS-operated vehicles), highly autonomous vehicles (e.g., vehicles that forego reliance on human intervention in certain situations such as Level 4 ADS-operated vehicles), conditional autonomous vehicles (e.g., vehicles that forego reliance on human intervention in limited situations such as Level 3 ADS-operated vehicles) and/or the like. In one embodiment, autonomous system 202 includes operational or tactical functionality required to operate vehicle 200 in on-road traffic and perform part or all of Dynamic Driving Task (DDT) on a sustained basis. In another embodiment, autonomous system 202 includes an Advanced Driver Assistance System (ADAS) that includes driver support features. Autonomous system 202 supports various levels of driving automation, ranging from no driving automation (e.g., Level 0) to full driving automation (e.g., Level 5). For a detailed description of fully autonomous vehicles and highly autonomous vehicles, reference may be made to SAE International's standard J3016: Taxonomy and Definitions for Terms Related to On-Road Motor Vehicle Automated Driving Systems, which is incorporated by reference in its entirety. In some embodiments, vehicle 200 is associated with an autonomous fleet manager and/or a ridesharing company.

Autonomous system 202 includes a sensor suite that includes one or more devices such as cameras 202a, LiDAR sensors 202b, radar sensors 202c, and microphones 202d. In some embodiments, autonomous system 202 can include more or fewer devices and/or different devices (e.g., ultrasonic sensors, inertial sensors, GPS receivers (discussed below), odometry sensors that generate data associated with an indication of a distance that vehicle 200 has traveled, and/or the like). In some embodiments, autonomous system 202 uses the one or more devices included in autonomous system 202 to generate data associated with environment 100, described herein. The data generated by the one or more devices of autonomous system 202 can be used by one or more systems described herein to observe the environment (e.g., environment 100) in which vehicle 200 is located. In some embodiments, autonomous system 202 includes communication device 202e, autonomous vehicle compute 202f, drive-by-wire (DBW) system 202h, and safety controller 202g.

Figure 3:
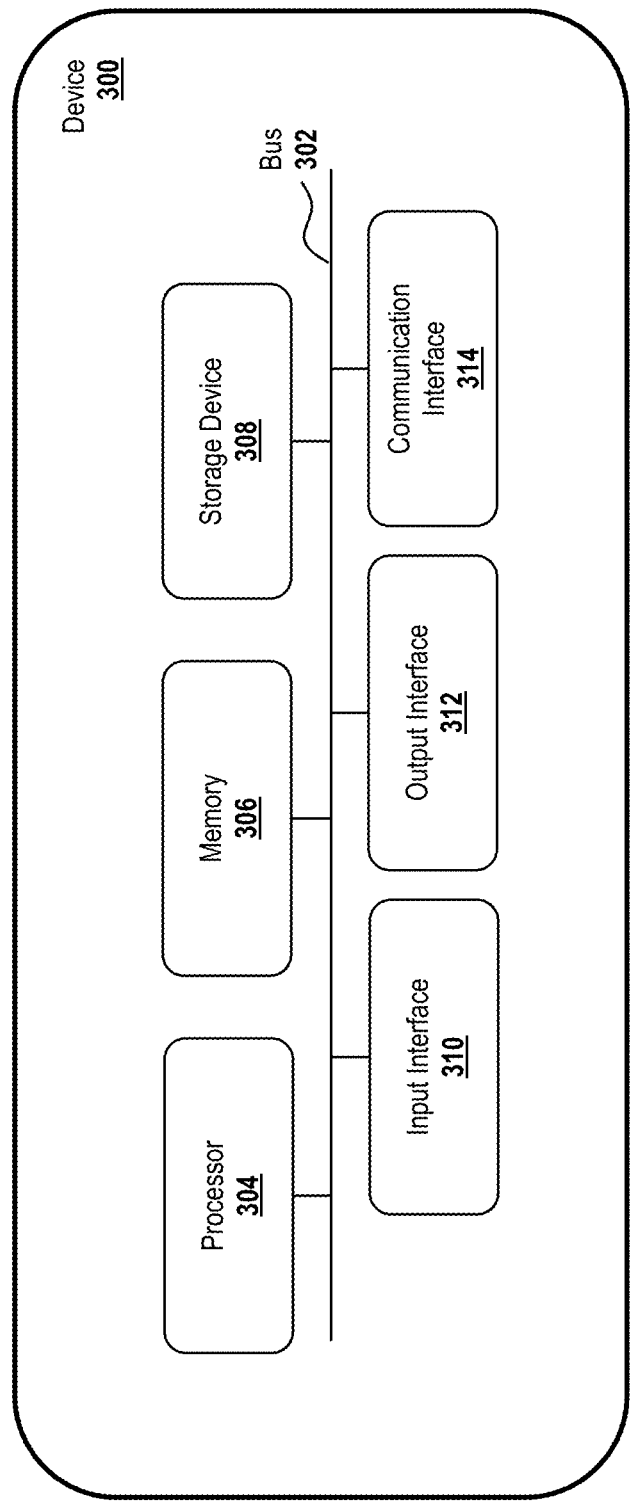
FIG. 3 is a diagram of components of one or more example devices and/or one or more example systems of FIGS. 1 and 2.

Cameras 202a include at least one device configured to be in communication with communication device 202e, autonomous vehicle compute 202f, and/or safety controller 202g via a bus (e.g., a bus that is the same as or similar to bus 302 of FIG. 3). Cameras 202a include at least one camera (e.g., a digital camera using a light sensor such as a Charge-Coupled Device (CCD), a thermal camera, an infrared (IR) camera, an event camera, and/or the like) to capture images including physical objects (e.g., cars, buses, curbs, people, and/or the like). In some embodiments, camera 202a generates camera data as output. In some examples, camera 202a generates camera data that includes image data associated with an image. In this example, the image data may specify at least one parameter (e.g., image characteristics such as exposure, brightness, etc., an image timestamp, and/or the like) corresponding to the image. In such an example, the image may be in a format (e.g., RAW, JPEG, PNG, and/or the like). In some embodiments, camera 202a includes a plurality of independent cameras configured on (e.g., positioned on) a vehicle to capture images for the purpose of stereopsis (stereo vision). In some examples, camera 202a includes a plurality of cameras that generate image data and transmit the image data to autonomous vehicle compute 202f and/or a fleet management system (e.g., a fleet management system that is the same as or similar to fleet management system 116 of FIG. 1). In such an example, autonomous vehicle compute 202f determines depth to one or more objects in a field of view of at least two cameras of the plurality of cameras based on the image data from the at least two cameras. In some embodiments, cameras 202a is configured to capture images of objects within a distance from cameras 202a (e.g., up to 100 meters, up to a kilometer, and/or the like). Accordingly, cameras 202a include features such as sensors and lenses that are optimized for perceiving objects that are at one or more distances from cameras 202a.

In an embodiment, camera 202a includes at least one camera configured to capture one or more images associated with one or more traffic lights, street signs and/or other physical objects that provide visual navigation information. In some embodiments, camera 202a generates traffic light data associated with one or more images. In some examples, camera 202a generates TLD (Traffic Light Detection) data associated with one or more images that include a format (e.g., RAW, JPEG, PNG, and/or the like). In some embodiments, camera 202a that generates TLD data differs from other systems described herein incorporating cameras in that camera 202a can include one or more cameras with a wide field of view (e.g., a wide-angle lens, a fish-eye lens, a lens having a viewing angle of approximately 120 degrees or more, and/or the like) to generate images about as many physical objects as possible.

Light Detection and Ranging (LiDAR) sensors 202b include at least one device configured to be in communication with communication device 202e, autonomous vehicle compute 202f, and/or safety controller 202g via a bus (e.g., a bus that is the same as or similar to bus 302 of FIG. 3). LiDAR sensors 202b include a system configured to transmit light from a light emitter (e.g., a laser transmitter). Light emitted by LiDAR sensors 202b include light (e.g., infrared light and/or the like) that is outside of the visible spectrum. In some embodiments, during operation, light emitted by LiDAR sensors 202b encounters a physical object (e.g., a vehicle) and is reflected back to LiDAR sensors 202b. In some embodiments, the light emitted by LiDAR sensors 202b does not penetrate the physical objects that the light encounters. LiDAR sensors 202b also include at least one light detector which detects the light that was emitted from the light emitter after the light encounters a physical object. In some embodiments, at least one data processing system associated with LiDAR sensors 202b generates an image (e.g., a point cloud, a combined point cloud, and/or the like) representing the objects included in a field of view of LiDAR sensors 202b. In some examples, the at least one data processing system associated with LiDAR sensor 202b generates an image that represents the boundaries of a physical object, the surfaces (e.g., the topology of the surfaces) of the physical object, and/or the like. In such an example, the image is used to determine the boundaries of physical objects in the field of view of LiDAR sensors 202b.

Radio Detection and Ranging (radar) sensors 202c include at least one device configured to be in communication with communication device 202e, autonomous vehicle compute 202f, and/or safety controller 202g via a bus (e.g., a bus that is the same as or similar to bus 302 of FIG. 3). Radar sensors 202c include a system configured to transmit radio waves (either pulsed or continuously). The radio waves transmitted by radar sensors 202c include radio waves that are within a predetermined spectrum In some embodiments, during operation, radio waves transmitted by radar sensors 202c encounter a physical object and are reflected back to radar sensors 202c. In some embodiments, the radio waves transmitted by radar sensors 202c are not reflected by some objects. In some embodiments, at least one data processing system associated with radar sensors 202c generates signals representing the objects included in a field of view of radar sensors 202c. For example, the at least one data processing system associated with radar sensor 202c generates an image that represents the boundaries of a physical object, the surfaces (e.g., the topology of the surfaces) of the physical object, and/or the like. In some examples, the image is used to determine the boundaries of physical objects in the field of view of radar sensors 202c.

Microphones 202d includes at least one device configured to be in communication with communication device 202e, autonomous vehicle compute 202f, and/or safety controller 202g via a bus (e.g., a bus that is the same as or similar to bus 302 of FIG. 3). Microphones 202d include one or more microphones (e.g., array microphones, external microphones, and/or the like) that capture audio signals and generate data associated with (e.g., representing) the audio signals. In some examples, microphones 202d include transducer devices and/or like devices. In some embodiments, one or more systems described herein can receive the data generated by microphones 202d and determine a position of an object relative to vehicle 200 (e.g., a distance and/or the like) based on the audio signals associated with the data.

Communication device 202e includes at least one device configured to be in communication with cameras 202a, LiDAR sensors 202b, radar sensors 202c, microphones 202d, autonomous vehicle compute 202f, safety controller 202g, and/or DBW (Drive-By-Wire) system 202h. For example, communication device 202e may include a device that is the same as or similar to communication interface 314 of FIG. 3. In some embodiments, communication device 202e includes a vehicle-to-vehicle (V2V) communication device (e.g., a device that enables wireless communication of data between vehicles).

Autonomous vehicle compute 202f include at least one device configured to be in communication with cameras 202a, LiDAR sensors 202b, radar sensors 202c, microphones 202d, communication device 202e, safety controller 202g, and/or DBW system 202h. In some examples, autonomous vehicle compute 202f includes a device such as a client device, a mobile device (e.g., a cellular telephone, a tablet, and/or the like), a server (e.g., a computing device including one or more central processing units, graphical processing units, and/or the like), and/or the like. In some embodiments, autonomous vehicle compute 202f is the same as or similar to autonomous vehicle compute 400, described herein. Additionally, or alternatively, in some embodiments autonomous vehicle compute 202f is configured to be in communication with an autonomous vehicle system (e.g., an autonomous vehicle system that is the same as or similar to remote AV system 114 of FIG. 1), a fleet management system (e.g., a fleet management system that is the same as or similar to fleet management system 116 of FIG. 1), a V2I device (e.g., a V2I device that is the same as or similar to V2I device 110 of FIG. 1), and/or a V2I system (e.g., a V2I system that is the same as or similar to V2I system 118 of FIG. 1).

Safety controller 202g includes at least one device configured to be in communication with cameras 202a, LiDAR sensors 202b, radar sensors 202c, microphones 202d, communication device 202e, autonomous vehicle computer 202f, and/or DBW system 202h. In some examples, safety controller 202g includes one or more controllers (electrical controllers, electromechanical controllers, and/or the like) that are configured to generate and/or transmit control signals to operate one or more devices of vehicle 200 (e.g., powertrain control system 204, steering control system 206, brake system 208, and/or the like). In some embodiments, safety controller 202g is configured to generate control signals that take precedence over (e.g., overrides) control signals generated and/or transmitted by autonomous vehicle compute 202f.

DBW system 202h includes at least one device configured to be in communication with communication device 202e and/or autonomous vehicle compute 202f. In some examples, DBW system 202h includes one or more controllers (e.g., electrical controllers, electromechanical controllers, and/or the like) that are configured to generate and/or transmit control signals to operate one or more devices of vehicle 200 (e.g., powertrain control system 204, steering control system 206, brake system 208, and/or the like). Additionally, or alternatively, the one or more controllers of DBW system 202h are configured to generate and/or transmit control signals to operate at least one different device (e.g., a turn signal, headlights, door locks, windshield wipers, and/or the like) of vehicle 200.

Powertrain control system 204 includes at least one device configured to be in communication with DBW system 202h. In some examples, powertrain control system 204 includes at least one controller, actuator, and/or the like. In some embodiments, powertrain control system 204 receives control signals from DBW system 202h and powertrain control system 204 causes vehicle 200 make longitudinal vehicle motion, such as to start moving forward, stop moving forward, start moving backward, stop moving backward, accelerate in a direction, decelerate in a direction or to make lateral vehicle motion such as performing a left turn, performing a right turn, and/or the like. In an example, powertrain control system 204 causes the energy (e.g., fuel, electricity, and/or the like) provided to a motor of the vehicle to increase, remain the same, or decrease, thereby causing at least one wheel of vehicle 200 to rotate or not rotate. In other words, steering control system 206 causes activities necessary for the regulation of the y-axis component of vehicle motion.

Steering control system 206 includes at least one device configured to rotate one or more wheels of vehicle 200. In some examples, steering control system 206 includes at least one controller, actuator, and/or the like. In some embodiments, steering control system 206 causes the front two wheels and/or the rear two wheels of vehicle 200 to rotate to the left or right to cause vehicle 200 to turn to the left or right.

Brake system 208 includes at least one device configured to actuate one or more brakes to cause vehicle 200 to reduce speed and/or remain stationary. In some examples, brake system 208 includes at least one controller and/or actuator that is configured to cause one or more calipers associated with one or more wheels of vehicle 200 to close on a corresponding rotor of vehicle 200. Additionally, or alternatively, in some examples brake system 208 includes an automatic emergency braking (AEB) system, a regenerative braking system, and/or the like.

In some embodiments, vehicle 200 includes at least one platform sensor (not explicitly illustrated) that measures or infers properties of a state or a condition of vehicle 200. In some examples, vehicle 200 includes platform sensors such as a global positioning system (GPS) receiver, an inertial measurement unit (IMU), a wheel speed sensor, a wheel brake pressure sensor, a wheel torque sensor, an engine torque sensor, a steering angle sensor, and/or the like. Although brake system 208 is illustrated to be located in the near side of vehicle 200 in FIG. 2, brake system 208 may be located anywhere in vehicle 200.

Referring now to FIG. 3, illustrated is a schematic diagram of a device 300. As illustrated, device 300 includes processor 304, memory 306, storage component 308, input interface 310, output interface 312, communication interface 314, and bus 302. In some embodiments, device 300 corresponds to at least one device of vehicles 102 (e.g., at least one device of a system of vehicles 102), at least one device of remote AV system 114, fleet management system 116, V2I system 118, and/or one or more devices of network 112 (e.g., one or more devices of a system of network 112). In some embodiments, one or more devices of vehicles 102 (e.g., one or more devices of a system of vehicles 102 such as at least one device of remote AV system 114, fleet management system 116, and V2I system 118, and/or one or more devices of network 112 (e.g., one or more devices of a system of network 112) include at least one device 300 and/or at least one component of device 300. As shown in FIG. 3, device 300 includes bus 302, processor 304, memory 306, storage component 308, input interface 310, output interface 312, and communication interface 314.

Bus 302 includes a component that permits communication among the components of device 300. In some cases, processor 304 includes a processor (e.g., a central processing unit (CPU), a graphics processing unit (GPU), an accelerated processing unit (APU), and/or the like), a microphone, a digital signal processor (DSP), and/or any processing component (e.g., a field-programmable gate array (FPGA), an application specific integrated circuit (ASIC), and/or the like) that can be programmed to perform at least one function. Memory 306 includes random access memory (RAM), read-only memory (ROM), and/or another type of dynamic and/or static storage device (e.g., flash memory, magnetic memory, optical memory, and/or the like) that stores data and/or instructions for use by processor 304.

Storage component 308 stores data and/or software related to the operation and use of device 300. In some examples, storage component 308 includes a hard disk (e.g., a magnetic disk, an optical disk, a magneto-optic disk, a solid state disk, and/or the like), a compact disc (CD), a digital versatile disc (DVD), a floppy disk, a cartridge, a magnetic tape, a CD-ROM, RAM, PROM, EPROM, FLASH-EPROM, NV-RAM, and/or another type of computer readable medium, along with a corresponding drive.

Input interface 310 includes a component that permits device 300 to receive information, such as via user input (e.g., a touchscreen display, a keyboard, a keypad, a mouse, a button, a switch, a microphone, a camera, and/or the like). Additionally or alternatively, in some embodiments input interface 310 includes a sensor that senses information (e.g., a global positioning system (GPS) receiver, an accelerometer, a gyroscope, an actuator, and/or the like). Output interface 312 includes a component that provides output information from device 300 (e.g., a display, a speaker, one or more light-emitting diodes (LEDs), and/or the like).

In some embodiments, communication interface 314 includes a transceiver-like component (e.g., a transceiver, a separate receiver and transmitter, and/or the like) that permits device 300 to communicate with other devices via a wired connection, a wireless connection, or a combination of wired and wireless connections. In some examples, communication interface 314 permits device 300 to receive information from another device and/or provide information to another device. In some examples, communication interface 314 includes an Ethernet interface, an optical interface, a coaxial interface, an infrared interface, a radio frequency (RF) interface, a universal serial bus (USB) interface, a Wi-Fi® interface, a cellular network interface, and/or the like.

In some embodiments, device 300 performs one or more processes described herein. Device 300 performs these processes based on processor 304 executing software instructions stored by a computer-readable medium, such as memory 305 and/or storage component 308. A computer-readable medium (e.g., a non-transitory computer readable medium) is defined herein as a non-transitory memory device. A non-transitory memory device includes memory space located inside a single physical storage device or memory space spread across multiple physical storage devices.

In some embodiments, software instructions are read into memory 306 and/or storage component 308 from another computer-readable medium or from another device via communication interface 314. When executed, software instructions stored in memory 306 and/or storage component 308 cause processor 304 to perform one or more processes described herein. Additionally or alternatively, hardwired circuitry is used in place of or in combination with software instructions to perform one or more processes described herein. Thus, embodiments described herein are not limited to any specific combination of hardware circuitry and software unless explicitly stated otherwise.

Memory 306 and/or storage component 308 includes data storage or at least one data structure (e.g., a database and/or the like). Device 300 is capable of receiving information from, storing information in, communicating information to, or searching information stored in the data storage or the at least one data structure in memory 306 or storage component 308. In some examples, the information includes network data, input data, output data, or any combination thereof.

In some embodiments, device 300 is configured to execute software instructions that are either stored in memory 306 and/or in the memory of another device (e.g., another device that is the same as or similar to device 300). As used herein, the term "module" refers to at least one instruction stored in memory 306 and/or in the memory of another device that, when executed by processor 304 and/or by a processor of another device (e.g., another device that is the same as or similar to device 300) cause device 300 (e.g., at least one component of device 300) to perform one or more processes described herein. In some embodiments, a module is implemented in software, firmware, hardware, and/or the like.

The number and arrangement of components illustrated in FIG. 3 are provided as an example. In some embodiments, device 300 can include additional components, fewer components, different components, or differently arranged components than those illustrated in FIG. 3. Additionally or alternatively, a set of components (e.g., one or more components) of device 300 can perform one or more functions described as being performed by another component or another set of components of device 300.

Figure 4:
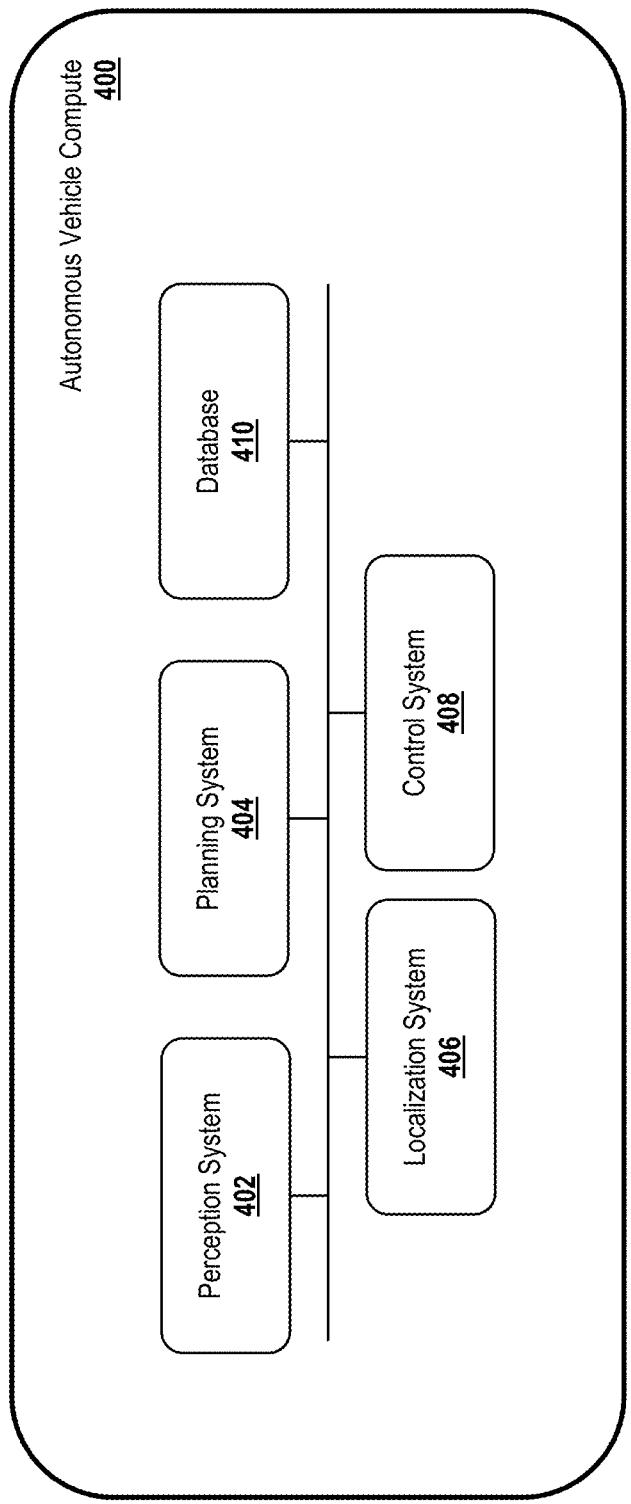
FIG. 4 is a diagram of certain components of an example autonomous system.

Referring now to FIG. 4, illustrated is an example block diagram of an autonomous vehicle compute 400 (sometimes referred to as an "AV stack"). As illustrated, autonomous vehicle compute 400 includes perception system 402 (sometimes referred to as a perception module), planning system 404 (sometimes referred to as a planning module), localization system 406 (sometimes referred to as a localization module), control system 408 (sometimes referred to as a control module), and database 410. In some embodiments, perception system 402, planning system 404, localization system 406, control system 408, and database 410 are included and/or implemented in an autonomous navigation system of a vehicle (e.g., autonomous vehicle compute 202f of vehicle 200). Additionally, or alternatively, in some embodiments perception system 402, planning system 404, localization system 406, control system 408, and database 410 are included in one or more standalone systems (e.g., one or more systems that are the same as or similar to autonomous vehicle compute 400 and/or the like). In some examples, perception system 402, planning system 404, localization system 406, control system 408, and database 410 are included in one or more standalone systems that are located in a vehicle and/or at least one remote system as described herein. In some embodiments, any and/or all of the systems included in autonomous vehicle compute 400 are implemented in software (e.g., in software instructions stored in memory), computer hardware (e.g., by microprocessors, microcontrollers, application-specific integrated circuits (ASICs), Field Programmable Gate Arrays (FPGAs), and/or the like), or combinations of computer software and computer hardware. It will also be understood that, in some embodiments, autonomous vehicle compute 400 is configured to be in communication with a remote system (e.g., an autonomous vehicle system that is the same as or similar to remote AV system 114, a fleet management system 116 that is the same as or similar to fleet management system 116, a V2I system that is the same as or similar to V2I system 118, and/or the like).

In some embodiments, perception system 402 receives data associated with at least one physical object (e.g., data that is used by perception system 402 to detect the at least one physical object) in an environment and classifies the at least one physical object. In some examples, perception system 402 receives image data captured by at least one camera (e.g., cameras 202a), the image associated with (e.g., representing) one or more physical objects within a field of view of the at least one camera. In such an example, perception system 402 classifies at least one physical object based on one or more groupings of physical objects (e.g., bicycles, vehicles, traffic signs, pedestrians, and/or the like). In some embodiments, perception system 402 transmits data associated with the classification of the physical objects to planning system 404 based on perception system 402 classifying the physical objects.

In some embodiments, planning system 404 receives data associated with a destination and generates data associated with at least one route (e.g., routes 106) along which a vehicle (e.g., vehicles 102) can travel along toward a destination. In some embodiments, planning system 404 periodically or continuously receives data from perception system 402 (e.g., data associated with the classification of physical objects, described above) and planning system 404 updates the at least one trajectory or generates at least one different trajectory based on the data generated by perception system 402. In other words, planning system 404 may perform tactical function-related tasks that are required to operate vehicle 102 in on-road traffic. Tactical efforts involve maneuvering the vehicle in traffic during a trip, including but not limited to deciding whether and when to overtake another vehicle, change lanes, or selecting an appropriate speed, acceleration, deacceleration, etc. In some embodiments, planning system 404 receives data associated with an updated position of a vehicle (e.g., vehicles 102) from localization system 406 and planning system 404 updates the at least one trajectory or generates at least one different trajectory based on the data generated by localization system 406.

In some embodiments, localization system 406 receives data associated with (e.g., representing) a location of a vehicle (e.g., vehicles 102) in an area. In some examples, localization system 406 receives LiDAR data associated with at least one point cloud generated by at least one LiDAR sensor (e.g., LiDAR sensors 202b). In certain examples, localization system 406 receives data associated with at least one point cloud from multiple LiDAR sensors and localization system 406 generates a combined point cloud based on each of the point clouds. In these examples, localization system 406 compares the at least one point cloud or the combined point cloud to two-dimensional (2D) and/or a three-dimensional (3D) map of the area stored in database 410. Localization system 406 then determines the position of the vehicle in the area based on localization system 406 comparing the at least one point cloud or the combined point cloud to the map. In some embodiments, the map includes a combined point cloud of the area generated prior to navigation of the vehicle. In some embodiments, maps include, without limitation, high-precision maps of the roadway geometric properties, maps describing road network connectivity properties, maps describing roadway physical properties (such as traffic speed, traffic volume, the number of vehicular and cyclist traffic lanes, lane width, lane traffic directions, or lane marker types and locations, or combinations thereof), and maps describing the spatial locations of road features such as crosswalks, traffic signs or other travel signals of various types. In some embodiments, the map is generated in real-time based on the data received by the perception system.

In another example, localization system 406 receives Global Navigation Satellite System (GNSS) data generated by a global positioning system (GPS) receiver. In some examples, localization system 406 receives GNSS data associated with the location of the vehicle in the area and localization system 406 determines a latitude and longitude of the vehicle in the area. In such an example, localization system 406 determines the position of the vehicle in the area based on the latitude and longitude of the vehicle. In some embodiments, localization system 406 generates data associated with the position of the vehicle. In some examples, localization system 406 generates data associated with the position of the vehicle based on localization system 406 determining the position of the vehicle. In such an example, the data associated with the position of the vehicle includes data associated with one or more semantic properties corresponding to the position of the vehicle.

In some embodiments, control system 408 receives data associated with at least one trajectory from planning system 404 and control system 408 controls operation of the vehicle. In some examples, control system 408 receives data associated with at least one trajectory from planning system 404 and control system 408 controls operation of the vehicle by generating and transmitting control signals to cause a powertrain control system (e.g., DBW system 202h, powertrain control system 204, and/or the like), a steering control system (e.g., steering control system 206), and/or a brake system (e.g., brake system 208) to operate. For example, control system 408 is configured to perform operational functions such as a lateral vehicle motion control or a longitudinal vehicle motion control. The lateral vehicle motion control causes activities necessary for the regulation of the y-axis component of vehicle motion. The longitudinal vehicle motion control causes activities necessary for the regulation of the x-axis component of vehicle motion. In an example, where a trajectory includes a left turn, control system 408 transmits a control signal to cause steering control system 206 to adjust a steering angle of vehicle 200, thereby causing vehicle 200 to turn left. Additionally, or alternatively, control system 408 generates and transmits control signals to cause other devices (e.g., headlights, turn signal, door locks, windshield wipers, and/or the like) of vehicle 200 to change states.

In some embodiments, perception system 402, planning system 404, localization system 406, and/or control system 408 implement at least one machine learning model (e.g., at least one multilayer perceptron (MLP), at least one convolutional neural network (CNN), at least one recurrent neural network (RNN), at least one autoencoder, at least one transformer, and/or the like). In some examples, perception system 402, planning system 404, localization system 406, and/or control system 408 implement at least one machine learning model alone or in combination with one or more of the above-noted systems. In some examples, perception system 402, planning system 404, localization system 406, and/or control system 408 implement at least one machine learning model as part of a pipeline (e.g., a pipeline for identifying one or more objects located in an environment and/or the like).

Database 410 stores data that is transmitted to, received from, and/or updated by perception system 402, planning system 404, localization system 406 and/or control system 408. In some examples, database 410 includes a storage component (e.g., a storage component that is the same as or similar to storage component 308 of FIG. 3) that stores data and/or software related to the operation and uses at least one system of autonomous vehicle compute 400. In some embodiments, database 410 stores data associated with 2D and/or 3D maps of at least one area. In some examples, database 410 stores data associated with 2D and/or 3D maps of a portion of a city, multiple portions of multiple cities, multiple cities, a county, a state, a State (e.g., a country), and/or the like. In such an example, a vehicle (e.g., a vehicle that is the same as or similar to vehicles 102 and/or vehicle 200) can drive along one or more drivable regions (e.g., single-lane roads, multi-lane roads, highways, back roads, off road trails, and/or the like) and cause at least one LiDAR sensor (e.g., a LiDAR sensor that is the same as or similar to LiDAR sensors 202b) to generate data associated with an image representing the objects included in a field of view of the at least one LiDAR sensor.

In some embodiments, database 410 can be implemented across a plurality of devices. In some examples, database 410 is included in a vehicle (e.g., a vehicle that is the same as or similar to vehicles 102 and/or vehicle 200), an autonomous vehicle system (e.g., an autonomous vehicle system that is the same as or similar to remote AV system 114, a fleet management system (e.g., a fleet management system that is the same as or similar to fleet management system 116 of FIG. 1, a V2I system (e.g., a V2I system that is the same as or similar to V2I system 118 of FIG. 1) and/or the like.

Figure 5:
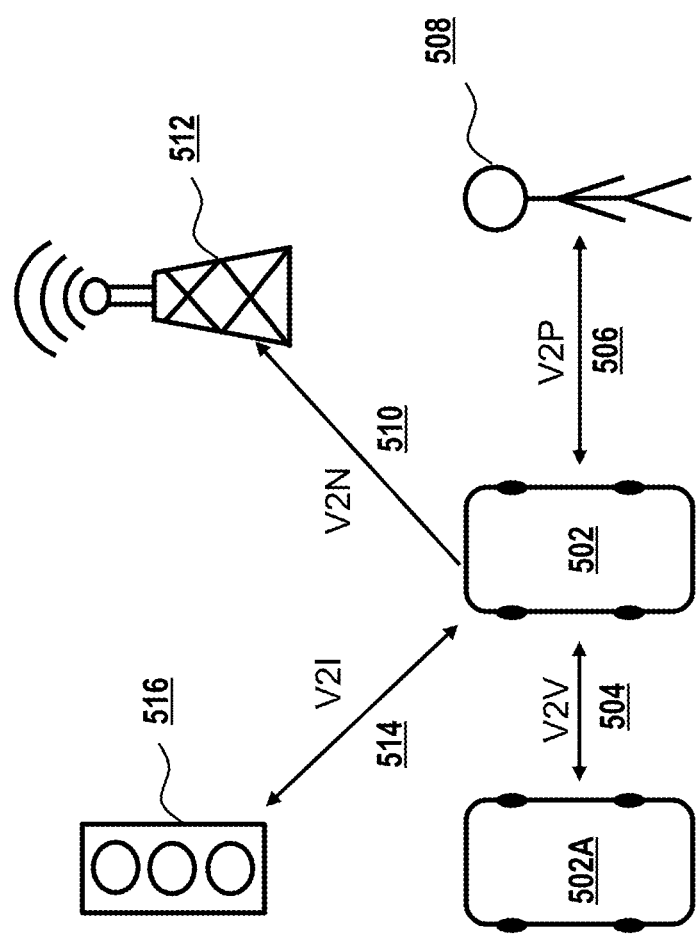
FIG. 5 is a diagram of an example situation for a V2X antenna.

Referring now to FIG. 5, illustrated is an example situation for a V2X antenna. As shown in the example of FIG. 5, a vehicle 502 (such as an autonomous vehicle that is the same as, or similar to, vehicle 200 of FIG. 2) is configured to perform a number of different V2X communications (e.g., different V2X scenarios or modes) using a V2X antenna. V2X communications include one or more of: V2V communication 504 with another vehicle 502A, V2P communication 506 with a person 508 (e.g., a person's mobile device), V2N communication 510 with a network node 512, and V2I communication 514 with a traffic light 516 (e.g., infrastructure). However, current V2X antennas provide only for signals having omni-directional characteristics, which are not optimized for the different types of V2X communications, resulting in non-optimized transmission. Specifically, each V2X communication can have a different radiation pattern. For example, the vehicle-to-vehicle (V2V) radiation pattern can be different from the vehicle-to-infrastructure (V2I) radiation pattern. Typical V2X antennas cannot cover both scenarios at optimum levels, and thus two antennas would be needed, or complicated beamforming techniques may need to be used.

The present disclosure relates to systems, methods, and autonomous vehicles that provide for a modification of a signal wavelength for a particular V2X communication. The modification of the signal wavelength can be known as quasi-beamforming in certain examples. In one or more examples or embodiments, the present disclosure is configured to change the signal wavelength when an autonomous vehicle is communicating V2I as compared to V2V.

Figure 6:
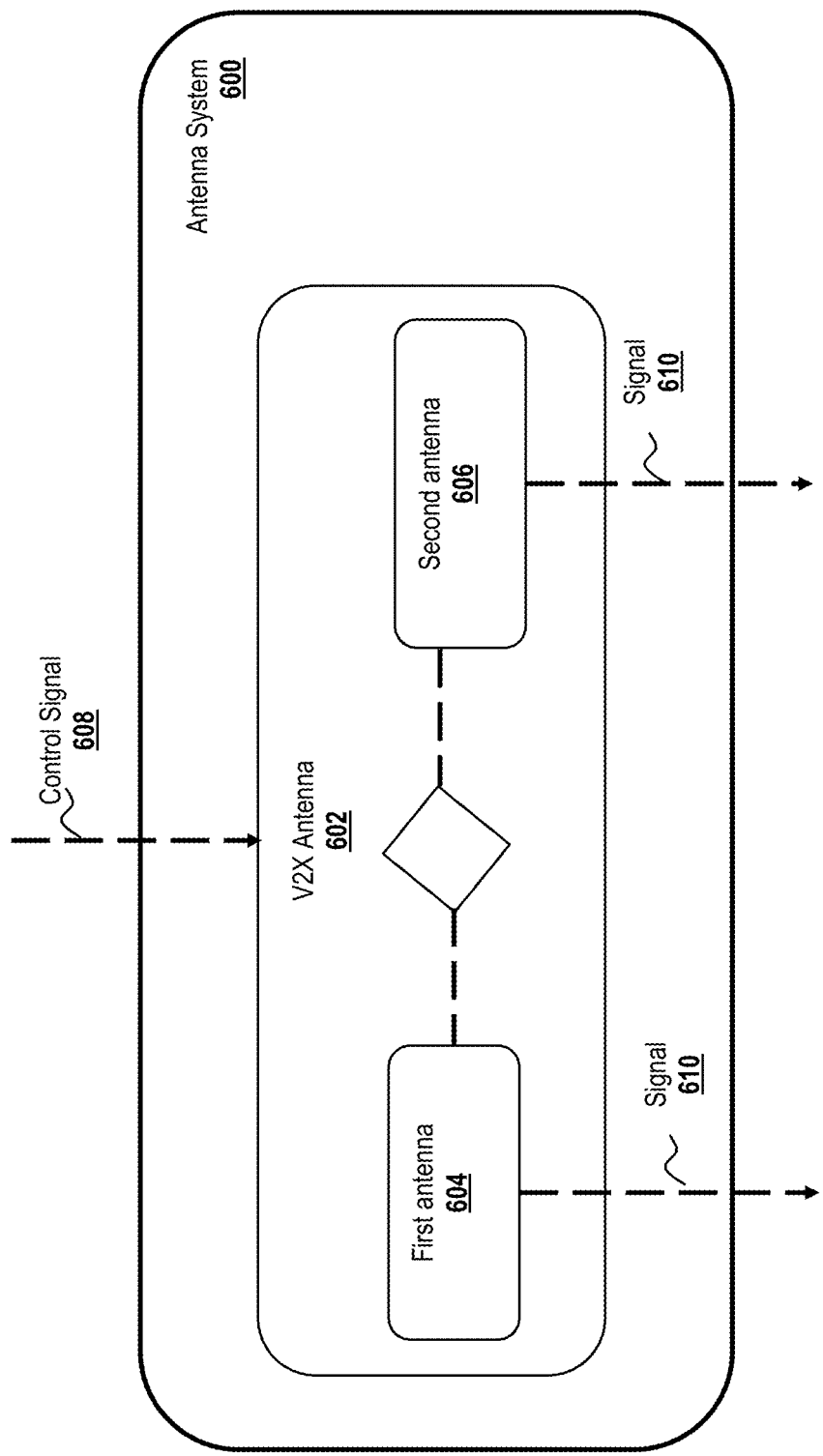
FIG. 6 is a diagram of an example implementation of a wavelength based V2X antenna.

Referring now to FIG. 6, illustrated is a block diagram of an example antenna system 600 for a wavelength based V2X antenna. In some implementations, the antenna system 600 is utilized in a situation such as shown in FIG. 5. In some embodiments, antenna system 600 is connected with and/or incorporated in a vehicle (e.g., an autonomous vehicle that is the same as, or similar to, vehicle 200 of FIG. 2 and vehicle 502 of FIG. 5). In one or more embodiments or examples, antenna system 600 is in communication with and/or a part of an AV (e.g., such as Autonomous System 202 illustrated in FIG. 2, device 300 of FIG. 3), an AV system, an AV compute (such as AV compute 202f of FIG. 2 and/or AV compute 400 of FIG. 4), a remote AV system (such as remote AV system 114 of FIG. 1), a communication device (such as communication device 202e of FIG. 2), a communication interface (such as communication interface 314 of FIG. 3), a fleet management system (such as fleet management system 116 of FIG. 1), and a V2I system (such as V2I system 118 of FIG. 1).

FIG. 6 is a diagram of an example implementation of an antenna system 600, such as a wavelength based V2X antenna. In one or more examples or embodiments, the antenna system 600 includes a Vehicle-to-Everything (V2X) antenna 602. In one or more examples or embodiments, the V2X antenna 602 includes a first antenna 604 having a first wavelength. In one or more examples or embodiments, the V2X antenna 602 includes a second antenna 606 having a second wavelength. In one or more examples or embodiments, the second wavelength is different than the first wavelength. In one or more examples or embodiments, the V2X antenna 602 is configured to control a wavelength of a signal 610 for transmission using one of the first antenna 604 and the second antenna 606.

In other words, the antenna system 600 is configured to vary the transmission wavelength of any signals 610 sent (e.g., transmitted) from the antenna system 600, which accordingly varies radiation patterns of the signal 610 in some examples. Accordingly, the beam pattern of the signal 610 (e.g., the beam pattern of the antenna intended to communicate the signal 610) can be changed by varying the wavelength transmitted by the particular antenna. Therefore, instead of omni-directional transmissions provided by previous V2X antennas, the disclosed antenna system can vary wavelengths for specific types of V2X communications. This can improve signal quality by avoiding signal mismatch, while reducing wasted power consumption.

In one or more examples or embodiments, the V2X antenna 602 is configured to communicate via different types of V2X communications. The V2X antenna 602 is an antenna configured to communicate using a V2X antenna. In one or more examples or embodiments, the V2X antenna 602 is configured to transmit a signal in one or more of: a vehicle-to-infrastructure (V2I) communication, vehicle-to-network (V2N) communication, vehicle-to-vehicle (V2V) communication, vehicle-to-pedestrian (V2P) communication, and vehicle-to-device (V2D) communication. The particular type of V2X communication is not limiting, and other types of communications can be used as well. In one or more examples or embodiments, the V2X antenna 602 is configured to transmit a signal centered on 5.9 GHz.

In some examples, the V2X antenna 602 is composed of a plurality of antennas, such as a first antenna 604, a second antenna 606, a third antenna, etc. In some examples or embodiments, at least two of the antennas (e.g., the first antenna 604, and the second antenna 606) have different wavelengths (e.g., a first wavelength and a second wavelength, respectively). In some examples or embodiments, each antenna of the V2X antenna has a different wavelength. As discussed herein, an antenna having a particular wavelength, such as the first antenna 604 having a first wavelength (e.g., first radiation pattern), can be construed as the first antenna 604 being configured to transmit and/or receive a signal 610 at the first wavelength and the second antenna 606 having a second wavelength (e.g., second radiation pattern) can be construed as the second antenna 606 being configured to transmit and/or receive a signal 610 at the second wavelength. In particular, in one or more examples or embodiments, a first antenna 604 having a first wavelength is construed as the first antenna 604 transmitting a signal 610 at the first wavelength. In one or more examples or embodiments, the first wavelength is 1.000 lambda (e.g., 1.000 of the wavelength of the signal). In one or more examples or embodiments, the second wavelength is 1.600-1.700 lambda.

As mentioned, in some examples the first antenna 604 has a first wavelength and the second antenna 606 has a second wavelength, which produces two different radiation patterns for the signal 610. In some examples, the first antenna 604 and the second antenna 606 are separate antennas. Alternatively, the first antenna 604 and the second antenna 606 are the same antenna with the capability of changing wavelengths. For example, the antenna system 600 and/or the V2X antenna 602 is configured to change the wavelength of a single antenna between the first wavelength and the second wavelength, thereby providing two different radiation patterns. As an example, the V2X antenna 602 is configured to adjust the radiation pattern of a signal by tuning the wavelength (e.g., quasi-beamforming) for transmission and/or reception of the signal. For example, the V2X antenna 602 is configured to control the wavelength of a signal for transmission. The V2X antenna 602 controls the wavelength by transmitting via either the first antenna 604 or the second antenna 606 in some examples. In one or more examples or embodiments, the V2X antenna 602 is configured to transmit the signal using one of the first antenna 604 and the second antenna 606.

In certain implementations, a switch can be used for directing an outgoing (e.g., transmitting) signal 610 from the V2X antenna 602. In one or more examples or embodiments, the V2X antenna 602 further includes a switch. In one or more examples or embodiments, the switch is communicatively coupled to the first antenna 604 and to the second antenna 606. In one or more examples or embodiments, the V2X antenna 602 is configured to use the switch for controlling the wavelength of the signal for transmission. In one or more examples or embodiments, when the switch is in a first position, the V2X antenna 602 transmits the signal in the first wavelength using the first antenna 604. In one or more examples or embodiments, when the switch is in a second position, the V2X antenna 602 transmits the signal in the second wavelength using the second antenna 606. Accordingly, the antenna system 600 is configured to adjust (e.g., toggle) the switch position for transmitting at a particular wavelength (e.g., from a particular antenna) in some examples.

In one or more examples or embodiments, the first antenna 604 has a first electrical length associated with the first wavelength. In one or more examples or embodiments, the second antenna 606 has a second electrical length associated with the second wavelength. In one or more examples or embodiments, the second electrical length is different from the first electrical length. In other words, the electrical length of the respective antenna, such as the first antenna 604 and the second antenna 606, can allow for the first antenna 604 and the second antennas 606 to perform a communication at different wavelengths. In some examples, the first antenna 604 and the second antenna 606 have different physical lengths.

In one or more examples or embodiments, the V2X antenna 602 is configured to receive one or more control signals 608 for the determination of which antenna to use. The control signal 608 can be used for operating the V2X antenna 602. For example, the antenna system 600 transmits the control signal 608 to the V2X antenna 602. In certain examples, a network (e.g., cloud network) transmits the control signal 608 to the V2X antenna 602 and/or to the antenna system 600. For example, the antenna system 600 includes a controller to receive the control signal and/or apply the controls indicated by the control signal 608. In one or more examples or embodiments, the V2X antenna 602 is configured to control the wavelength of the signal 610 for transmission by receiving a control signal 608 indicative of which of the first antenna 604 or the second antenna 606 to transmit from. In one or more examples or embodiments, the V2X antenna 602 is configured to control the wavelength of the signal 610 for transmission by transmitting the signal using one of the first antenna 604 and the second antenna 606 based on the control signal 608. In some examples, the control signal 608 is indicative of which wavelength to transmit the signal in some examples. In one or more examples or embodiments, the control signal 608 is indicative of a type of V2X communication (e.g., in which V2X mode, such as V2I and/or V2V and/or V2P and/or V2N the signal should be transmitted by the V2X antenna).

In some examples or embodiments, the V2X antenna 602 is configured to perform different types of V2X communications (e.g., transmit via different types of V2X modes) as discussed herein. In one or more examples or embodiments, the V2X antenna 602 is configured to transmit the signal 610 from the first antenna 604 as a V2V signal. In one or more examples or embodiments, the V2X antenna 602 is configured to transmit the signal 610 from the second antenna 606 as a V2I signal. These are merely examples, and any variation of the type of V2X communication from the particular antenna can be used.

As gain degradation can occur due to the use of differing wavelengths, it can be advantageous to adjust the signal 610 in some way. In one or more examples or embodiments, the V2X antenna 602 further includes a compensator configured to compensate for gain degradation of the signal 610. The compensator, in certain embodiments, is configured to amplify the signal 610. The compensator can be uni-directional or bi-directional. In one or more examples or embodiments, the V2X antenna 602 further includes a matcher configured to control a center of the wavelength. For example, the matcher is configured to tune an upper part and/or a lower part of the radiation pattern of a signal 610.

In certain examples, the disclosed antenna system 600 is configured to apply a quasi-beamforming technique for improving the efficiency of the antenna system 600, in particular the V2X antenna 602. In some examples, the disclosed antenna system 600 (e.g., the V2X antenna 602) applies a quasi-beamforming technique capable of providing the same or similar performance as conventional beamforming, while ensuring a simple and efficient structure into the autonomous vehicle. Such a simple and efficient structure is a structure that allows for an easy implementation of the disclosed technique(s) in an autonomous vehicle, leading to a decrease in hardware complexity, a reduction in the autonomous vehicle's space to integrate accommodate respective quasi-beamforming components, and a reduction in the power consumption. In one or more examples or embodiments, the V2X antenna 602 does not include a beamformer. In one or more examples or embodiments, the antenna system 600 does not include a beamformer. For example, the V2X antenna 602 and/or the antenna system 600 is not used (or configured for use) for multiple-input multiple-output (MIMO) communication. For example, quasi-beamforming involves changing the antenna beam by wavelength using one antenna. Quasi-beamforming generates less beam pattern than conventional beamforming (which controls, using a complex structure, the antenna beam based on current flow on many antenna elements). AS V2X application doesn't need precise beam patterns, quasi-beamforming can advantageously be utilized for V2X systems such as V2V and V2I.

In one or more examples or embodiments, the antenna system 600 uses a signal quality parameter for the determination of which of the first antenna 604 or the second antenna 606 to use. This can avoid the need for using a control signal 608, and the antenna system 600 can determine the proper antenna internally. In one or more examples or embodiments, the antenna system 600 is configured to determine a signal quality parameter indicative of a quality of a received signal. In one or more examples or embodiments, the V2X antenna 602 is configured to transmit the signal using one of the first antenna 604 and the second antenna 606 based on the signal quality parameter. In certain examples, the signal quality parameter is indicative of one or more of: signal-to-noise ratio (SNR), signal to interference & noise ratio (SINR), received signal strength indicator (RSSI), and channel quality indicator (CQI).

Figure 7:
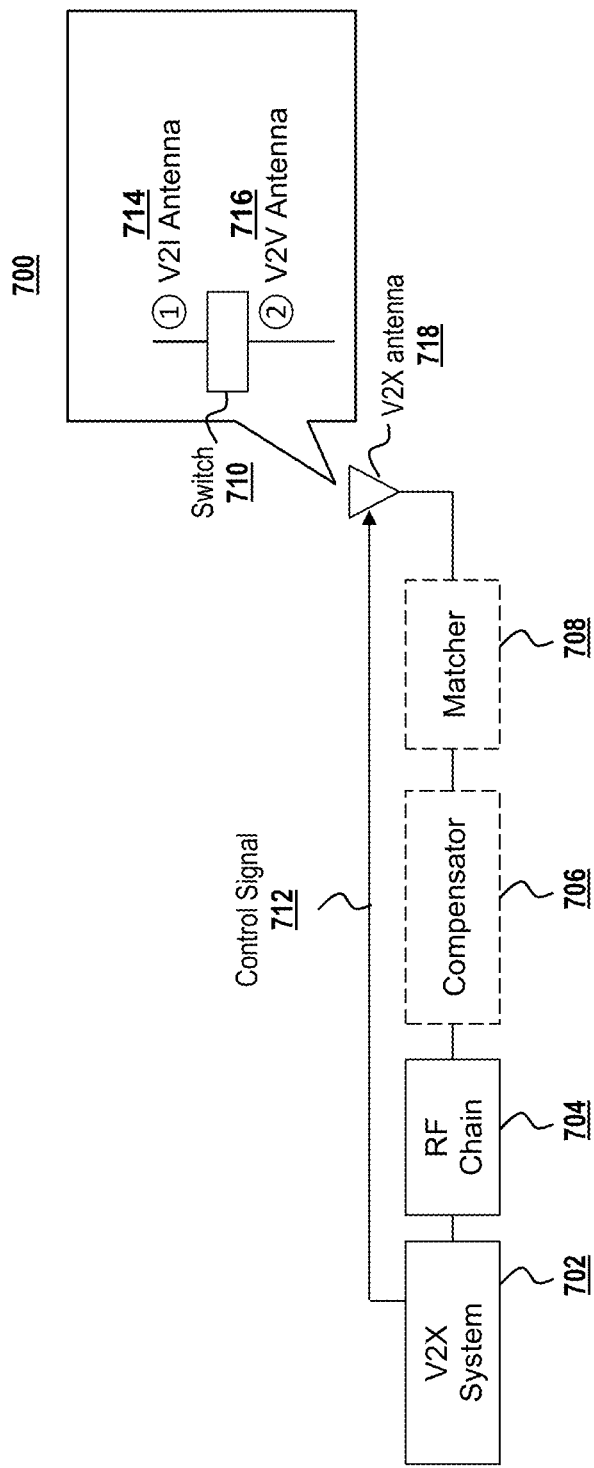
FIG. 7 is a diagram of an example implementation of a wavelength based V2X antenna.

FIG. 7 is a diagram of an example implementation of the disclosed antenna system 700, e.g., using a wavelength based V2X antenna 718. In certain examples, the antenna system 700 is associated with an autonomous vehicle. As shown, antenna system 700 includes a V2X system 702 (e.g., a V2X antenna). In one or more examples or embodiments, the V2X system 702 is configured to determine, receive, prepare, and/or transmit a radiofrequency signal. In some examples, the antenna system 700 includes a radiofrequency (RF) chain 704. The RF chain 704 optionally includes electronic components and sub-units, such as amplifiers, filters, mixers, attenuators, detectors, for preparing transmission and reception of a radiofrequency signal. The particular components in the RF chain 704 are not limiting.

Further, the antenna system 700 optionally includes a compensator 706. The compensator 706 compensates incoming or outgoing signals if used. For example, the compensator 706 compensates for gain degradation which can occur. As gain can be lost during reception and/or transmission, the compensator 706 can be used to adjust gain levels for optimized signal. In one or more examples or embodiments, the compensator 706 includes one or more amplifiers. Additionally, the antenna system 700 optionally includes a matcher 708. The matcher 708 matches signals if used. In particular, the antenna system 700 can transmit and/or receive signals in wavelengths other than "standard" or "normal" (e.g., signal wavelengths that are typically used). The matcher 708, in some embodiments, tunes upper and/or lower parts of the radiation pattern of the signal. In one or more examples or embodiments, the matcher 708 shifts the center of the wavelength. For example, the matcher 708 centers the wavelength of the signal at 5.7 Ghz, though other centerings can be used as well.

In one or more examples or embodiments, the antenna system 700 includes a switch 710 for changing between a V2I antenna 714 and a V2V antenna 716 (e.g., for changing wavelengths of signals whether using a single antenna or multiple antennas). By switching between the two antennas via switch 710, signals with different wavelengths can be transmitted from the wavelength based antenna system 700. For example, the wavelength based antenna system 700 transmits signals on different wavelengths based on the switch 710. V2I antenna 714 and V2V antenna 716 can be separate antennas, or can each provide communication at different wavelengths. For example, the V2I antenna 714 has an electrical length providing a communication at a first wavelength. For example, the V2V antenna 716 has an electrical length providing a communication at a second wavelength different from the first wavelength. In other words, the switch 710 is configured to change (e.g., to control) the wavelength of a signal for transmission by the wavelength based antenna system 700 in certain examples. Other types of V2X antennas can be used as well, and the disclosure is not limited to a V2I antenna 714 and V2V antenna 716. In one or more examples or embodiments, a control signal 712 is used to control the switch 710 for operating with respect to a particular scenario (e.g., to a V2X scenario). In some examples, the control signal 712 is provided by the V2X system 702. In one or more examples or embodiments, other components of the antenna system 700 can provide the control signal 712. The control signal 712 can be received by the wavelength based V2X antenna 718.

Figure 8A:
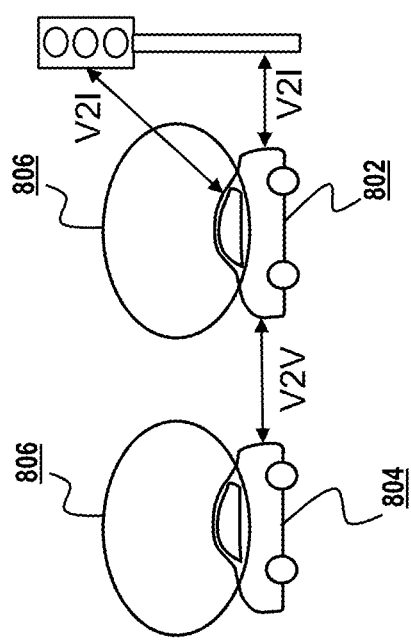
FIG. 8A is a diagram of a conventional V2X antenna.

FIG. 8A is a diagram of a conventional V2X antenna setup 800. As shown, both vehicles 802, 804 use a standard omni-directional V2X antenna to achieve the radiation pattern 806 shown in FIG. 8A. While the omni-directional V2X antenna can support V2V and V2I communication, it is not optimal for these different communication scenarios.

Figure 8C:
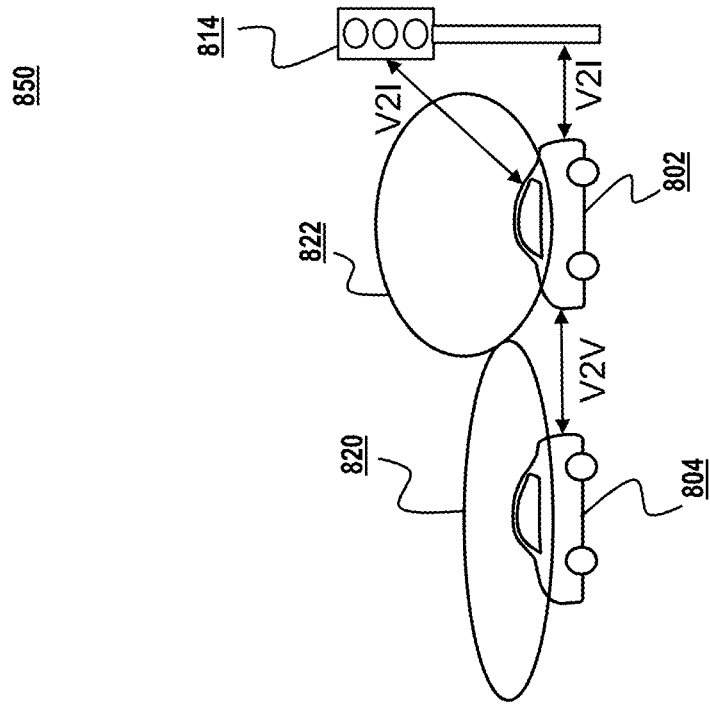
FIGS. 8B-8C are diagrams of examples implementations of a wavelength based V2X antenna.
Figure 8B:
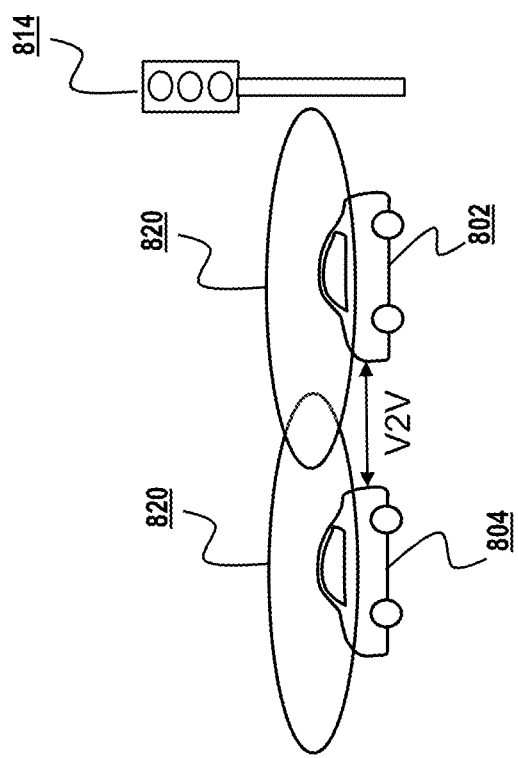

FIGS. 8B-8C are diagrams of examples implementations 850 of a wavelength based V2X antenna (or antenna system)

according to the disclosure. In one or more examples or embodiments, the V2X antenna of the disclosure (e.g., antenna system 600 of FIG. 6, antenna system 700 of FIG. 7, V2X antenna 602 of FIG. 6 and V2X antenna 718 of FIG. 7) adapts radiation patterns, via changing wavelengths, for communicating during different V2X scenarios. Advantageously, the change of wavelengths can provide for optimization of communication in different V2X scenarios (e.g., different V2X scenarios are covered by changing the wavelengths for transmission of signals).

For example, in FIG. 8B, vehicle 802 is communicating using a V2V communication with vehicle 804. Vehicle 802 is not communicating using a V2I communication with traffic light 814. As compared to FIG. 8A, the radiation patterns 820, due to the different wavelengths, have been changed for providing optimized V2V communication between vehicle 802 and vehicle 804. FIG. 8C illustrates how radiation patterns of the disclosed V2X antenna system can change based on changing wavelengths for providing optimized communication. As shown in FIG. 8C, a V2X antenna incorporated into vehicle 802 is now configured for V2I communication (e.g., to communicate with traffic light 814) whereas a V2X antenna incorporated into vehicle 804 is still configured for V2V communication (e.g., to communicate with vehicle 802). The respective radiation patterns, due to changes in wavelength, can be different depending on the type of V2X communication, allowing flexibility for optimizing communication. If vehicle 802 would switch to a V2V communication, the wavelength based V2X antenna system can adjust wavelengths so that the radiation pattern (e.g., radiation pattern 822) is back to the radiation pattern shown in FIG. 8B (e.g., radiation pattern 820) for V2V communication between vehicle 802 and vehicle 804.

Figure 9:
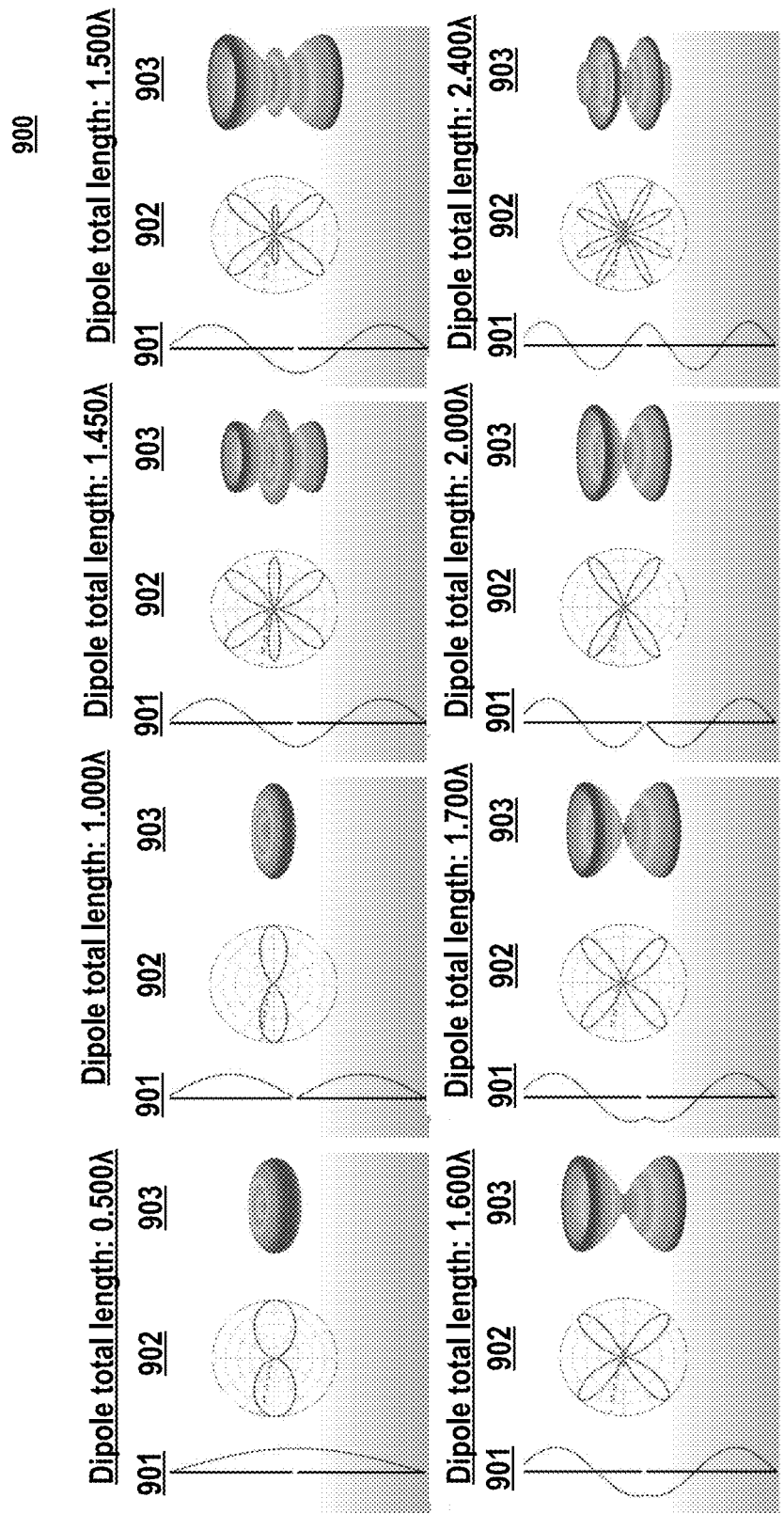
FIG. 9 is a diagram of an example wavelength patterns of a wavelength based V2X antenna.

FIG. 9 shows diagrams illustrating example wavelength patterns of a wavelength based V2X antenna system 900. The diagrams show current distribution 901 in the antenna with various dipole total lengths, a graph 902 illustrating the E-plane electric field normalized and a representation 903 of 3D electric field normalized. As shown, by varying the wavelength (λ), such as the first wavelength and the second wavelength, different radiation patterns can be created for transmission of a signal. FIG. 9 illustrates potential different radiation patterns that can be achieved by varying the wavelength for communication of a signal. FIG. 9 is not limiting, and other patterns can be used as well. Example wavelengths that can be used include 0.500λ, 1.000λ, 1.450λ, 1.500λ, 1.600λ, 1.700λ, 2.00λ and 2.400λ. As an example, 1.700λ and/or 1.600λ is advantageously used for V2I communication, whereas 1.000λ is used for V2V communications. As an example, 0.500λ-1.000λ is advantageously used for V2P and/or V2V communication, whereas 1.500-1.700λ is used for V2I and/or V2N (Vehicle to Network) communications. The advantageous wavelengths for a given V2X communication depend for example on the antenna design.

Referring now to FIG. 10, illustrated is a flowchart of a method or process 1000 for a wavelength based V2X antenna, such as for communication of an autonomous vehicle. The method 1000 can be performed by a system disclosed herein, such as an antenna system 600 of FIG. 6, an antenna system 700 of FIG. 7, a V2X antenna 602 of FIG. 6, an AV compute 202f of FIG. 2 and AV compute 400 of FIG. 4, a vehicle 102, 200, of FIGS. 1 and 2, respectively, device 300 of FIG. 3, and AV compute 400 of FIG. 4 and implementations 800, 850, 900 of FIGS. 8A-8C and FIG. 9, respectively. The antenna system disclosed can include at least one processor which can be configured to carry out one or more of the operations of method 1000. The method 1000 can be performed (e.g., completely, partially, and/or the like) by another device or group of devices separate from or including system disclosed herein.

Disclosed herein are embodiments of a method 1000, performed by a Vehicle to Everything, V2X, antenna. In one or more embodiments or examples, the V2X antenna includes a first antenna having a first wavelength. In one or more embodiments or examples, the V2X antenna includes a second antenna having a second wavelength different than the first wavelength. In one or more embodiments or examples, the method 1000 includes controlling, at step 1002, a wavelength of a signal for transmission using one of the first antenna and the second antenna. The V2X antenna, in some examples, is an antenna configured to communicate using a V2X system. For example, the V2X antenna is configured to transmit a signal centered on 5.9 GHz. For example, the first wavelength is 1.000 lambda and the second wavelength is 1.600-1.700 lambda. In one or more examples or embodiments, the method 1000 adjusts a radiation pattern of a signal by tuning the wavelength of the signal (e.g., quasi-beamforming) for transmission and/or reception.

In one or more embodiments or examples, the V2X antenna further includes a switch communicatively coupled to the first antenna and to the second antenna. In one or more embodiments or examples, controlling, at step 1002, the wavelength of the signal for transmission includes switching the switch. The method 1000, in some examples, includes toggling the switch. In one or more embodiments or examples, the method 1000 further includes, when the switch is in a first position, transmitting the signal in the first wavelength using the first antenna. In one or more embodiments or examples, the method 1000 further includes, when the switch is in a second position, transmitting the signal in the second wavelength using the second antenna. The control and/or switching of the wavelength is for example triggered by a signal from a global vehicle positioning module (GVPM).

In one or more embodiments or examples, the first antenna has a first electrical length associated with the first wavelength. In one or more embodiments or examples, the second antenna has a second electrical length associated with the second wavelength. In one or more embodiments or examples, the second electrical length is different from the first electrical length. The first antenna, in some examples, has a physical length different from a physical length of the second antenna.

In one or more embodiments or examples, controlling, at step 1002, the wavelength of the signal for transmission includes receiving a control signal indicative of which of the first antenna or the second antenna to transmit from. In one or more embodiments or examples, controlling, at step 1002, the wavelength of the signal for transmission includes transmitting the signal using one of the first antenna and the second antenna based on the control signal. The controlling, at step 1002, in certain examples is performed by a controller.

In one or more embodiments or examples, the method 1000 further includes transmitting the signal from the first antenna as a V2V signal. In one or more embodiments or examples, the method 1000 further includes transmitting the signal from the second antenna as a V2I signal. In one or more embodiments or examples, the method 1000 further includes compensating, using a compensator, for gain degradation of the signal. In one or more examples, the method 1000 includes amplifying the signal. For example, the signal is amplified by a uni-directional or a bi-directional amplifier. In one or more embodiments or examples, the method 1000 further includes controlling, using a matcher, a center of the wavelength. In one or more embodiments or examples, the method does not include beamforming. In one or more examples or embodiments, the method 1000 includes tuning an upper and/or lower part of a radiation pattern of the signal.

In one or more embodiments or examples, the method 1000 further includes determining a signal quality parameter indicative of a quality of a received signal. In one or more embodiments or examples, the method 1000 further includes transmitting the signal using one of the first antenna and the second antenna based on the signal quality parameter. The signal quality parameter, in some examples, is indicative of one or more of SNR, SINR, RSSI, and channel quality.

In the foregoing description, aspects and embodiments of the present disclosure have been described with reference to numerous specific details that can vary from implementation to implementation. Accordingly, the description and drawings are to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction. Any definitions expressly set forth herein for terms contained in such claims shall govern the meaning of such terms as used in the claims. In addition, when we use the term "further comprising," in the foregoing description or following claims, what follows this phrase can be an additional step or entity, or a sub-step/sub-entity of a previously-recited step or entity.

Disclosed are non-transitory computer readable media comprising instructions stored thereon that, when executed by at least one processor, cause the at least one processor to carry out operations according to one or more of the methods disclosed herein.

Also disclosed are methods, non-transitory computer readable media, autonomous vehicles, and antenna systems according to any of the following items:

Item 1. An antenna system comprising:
a Vehicle to Everything, V2X, antenna comprising:
a first antenna having a first wavelength; and
a second antenna having a second wavelength, the second wavelength being different than the first wavelength;
wherein the V2X antenna is configured to control a wavelength of a signal for transmission using one of the first antenna and the second antenna.

Item 2. The antenna system of item 1, wherein the V2X antenna further comprises a switch communicatively coupled to the first antenna and to the second antenna, and wherein the V2X antenna is configured to use the switch for controlling the wavelength of the signal for transmission.

Item 3. The antenna system of item 2, wherein when the switch is in a first position, the V2X antenna transmits the signal in the first wavelength using the first antenna, and wherein when the switch is in a second position, the V2X antenna transmits the signal in the second wavelength using the second antenna.

Item 4. The antenna system of any one of the previous items, wherein the V2X antenna is configured to transmit the signal using one of the first antenna and the second antenna.

Item 5. The antenna system of any one of the previous items, wherein the first antenna has a first electrical length associated with the first wavelength, wherein the second antenna has a second electrical length associated with the second wavelength, and wherein the second electrical length is different from the first electrical length.

Item 6. The antenna system of any one of the previous items, wherein the V2X antenna is configured to control the wavelength of the signal for transmission by:
receiving a control signal indicative of which of the first antenna or the second antenna to transmit from; and
transmitting the signal using one of the first antenna and the second antenna based on the control signal.

Item 7. The antenna system of any one of the previous items, wherein:
the V2X antenna is configured to transmit the signal from the first antenna as a V2V signal; and
the V2X antenna is configured to transmit the signal from the second antenna as a V2I signal.

Item 8. The antenna system of any one of the previous items, wherein the V2X antenna further comprises:
a compensator configured to compensate for gain degradation of the signal.

Item 9. The antenna system of any one of the previous items, wherein the V2X antenna further comprises:
a matcher configured to control a center of the wavelength.

Item 10. The antenna system of any one of the previous items, wherein the V2X antenna does not include a beamformer.

Item 11. The antenna system of any one of the previous items, wherein:
the antenna system is configured to determine a signal quality parameter indicative of a quality of a received signal; and
the V2X antenna is configured to transmit the signal using one of the first antenna and the second antenna based on the signal quality parameter.

Item 12. A method, performed by a Vehicle to Everything, V2X, antenna comprising a first antenna having a first wavelength and a second antenna having a second wavelength different than the first wavelength, wherein the method comprises:
controlling a wavelength of a signal for transmission using one of the first antenna and the second antenna.

Item 13. The method of item 12, wherein the V2X antenna further comprises a switch communicatively coupled to the first antenna and to the second antenna, and wherein controlling the wavelength of the signal for transmission comprises switching the switch.

Item 14. The method of item 13, the method further comprising:
when the switch is in a first position, transmitting the signal in the first wavelength using the first antenna; and
when the switch is in a second position, transmitting the signal in the second wavelength using the second antenna.

Item 15. The method of any one of items 12-14, wherein the first antenna has a first electrical length associated with the first wavelength, wherein the second antenna has a second electrical length associated with the second wavelength, and wherein the second electrical length is different from the first electrical length.

Item 16. The method of any one of items 12-15, wherein controlling the wavelength of the signal for transmission comprises:
receiving a control signal indicative of which of the first antenna or the second antenna to transmit from; and
transmitting the signal using one of the first antenna and the second antenna based on the control signal.

Item 17. The method of any one of items 12-16, the method further comprising:
transmitting the signal from the first antenna as a V2V signal; and
transmitting the signal from the second antenna as a V2I signal.

Item 18. The method of any one of items 12-17, the method further comprising:
compensating, using a compensator, for gain degradation of the signal.

Item 19. The method of any one of items 12-18, the method further comprising:
controlling, using a matcher, a center of the wavelength.

Item 20. The method of any one of items 12-19, wherein the method does not comprise beamforming.

Item 21. The method of any one of items 12-20, the method further comprising:
determining a signal quality parameter indicative of a quality of a received signal; and
transmitting the signal using one of the first antenna and the second antenna based on the signal quality parameter.

Item 22. An autonomous vehicle comprising:
a Vehicle to Everything, V2X, antenna comprising:
a first antenna having a first wavelength; and
a second antenna having a second wavelength, the second wavelength being different than the first wavelength;
wherein the V2X antenna is configured to control a wavelength of a signal for transmission using one of the first antenna and the second antenna.

Item 23. The autonomous vehicle of item 22, wherein the V2X antenna further comprises a switch communicatively coupled to the first antenna and to the second antenna, and wherein the V2X antenna is configured to use the switch for controlling the wavelength of the signal for transmission.

Item 24. The autonomous vehicle of item 23, wherein when the switch is in a first position, the V2X antenna transmits the signal in the first wavelength using the first antenna, and wherein when the switch is in a second position, the V2X antenna transmits the signal in the second wavelength using the second antenna.

Item 25. The autonomous vehicle of any one of items 22-24, wherein the V2X antenna is configured to transmit the signal using one of the first antenna and the second antenna.

Item 26. The autonomous vehicle of any one of items 22-25, wherein the first antenna has a first electrical length associated with the first wavelength, wherein the second antenna has a second electrical length associated with the second wavelength, and wherein the second electrical length is different from the first electrical length.

Item 27. The autonomous vehicle of any one of items 22-26, wherein the V2X antenna is configured to control the wavelength of the signal for transmission by:
receiving a control signal indicative of which of the first antenna or the second antenna to transmit from; and
transmitting the signal using one of the first antenna and the second antenna based on the control signal.

Item 28. The autonomous vehicle of any one of items 22-27, wherein:
the V2X antenna is configured to transmit the signal from the first antenna as a V2V signal; and
the V2X antenna is configured to transmit the signal from the second antenna as a V2I signal.

Item 29. The autonomous vehicle of any one of items 22-28, wherein the V2X antenna further comprises:
a compensator configured to compensate for gain degradation of the signal.

Item 30. The autonomous vehicle of any one of items 22-29, wherein the V2X antenna further comprises:
a matcher configured to control a center of the wavelength.

Item 31. The autonomous vehicle of any one of items 22-30, wherein the V2X antenna does not include a beamformer.

Item 32. The autonomous vehicle of any one of items 22-31, wherein:
the autonomous vehicle is configured to determine a signal quality parameter indicative of a quality of a received signal; and
the V2X antenna is configured transmit the signal using one of the first antenna and the second antenna based on the signal quality parameter.

What is claimed is:

1. An antenna system comprising:
a Vehicle to Everything (V2X) antenna comprising:
a first antenna configured to transmit a first wavelength;
a second antenna configured to transmit a second wavelength, the second wavelength being different than the first wavelength; and
a matcher configured to control a center of a wavelength of a signal for transmission;
wherein the V2X antenna is configured to control the wavelength of the signal for transmission using one of the first antenna and the second antenna.

2. The antenna system of claim 1, wherein the V2X antenna further comprises a switch communicatively coupled to the first antenna and to the second antenna, and wherein the V2X antenna is configured to use the switch for controlling the wavelength of the signal for transmission.

3. The antenna system of claim 2, wherein when the switch is in a first position, the V2X antenna transmits the wavelength of the signal for transmission in the first wavelength using the first antenna, and wherein when the switch is in a second position, the V2X antenna transmits the wavelength of the signal for transmission in the second wavelength using the second antenna.

4. The antenna system of claim 1, wherein the V2X antenna is configured to transmit the signal for transmission using one of the first antenna and the second antenna.

5. The antenna system of claim 1, wherein the first antenna has a first electrical length associated with the first wavelength, wherein the second antenna has a second electrical length associated with the second wavelength, and wherein the second electrical length is different from the first electrical length.

6. The antenna system of claim 1, wherein the V2X antenna is configured to control the wavelength of the signal for transmission by:
receiving a control signal indicative of which of the first antenna or the second antenna to transmit from; and
transmitting the signal for transmission using one of the first antenna and the second antenna based on the control signal.

7. The antenna system of claim 1, wherein:
the V2X antenna is configured to transmit the signal for transmission from the first antenna as a V2V signal; and
the V2X antenna is configured to transmit the signal for transmission from the second antenna as a V2I signal.

8. The antenna system of claim 1, wherein the V2X antenna further comprises:
a compensator configured to compensate for gain degradation of the signal for transmission.

9. The antenna system of claim 1, wherein the matcher is configured to control the center of the wavelength of the signal for transmission by shifting the center of the wavelength of the signal for transmission.

10. The antenna system of claim 1, wherein the V2X antenna does not include a beamformer.

11. The antenna system of claim 1, wherein:
the antenna system is configured to determine a signal quality parameter indicative of a quality of a received signal; and
the V2X antenna is configured to transmit the signal for transmission using one of the first antenna and the second antenna based on the signal quality parameter.

12. A method, performed by a Vehicle to Everything, V2X, antenna comprising a first antenna configured to transmit a first wavelength, a second antenna configured to transmit a second wavelength different than the first wavelength, and a matcher configured to control a center of a wavelength of a signal for transmission, wherein the method comprises:
controlling the wavelength of the signal for transmission using one of the first antenna and the second antenna; and
controlling, via the matcher, the center of the wavelength of the signal for transmission.

13. The method of claim 12, wherein the V2X antenna further comprises a switch communicatively coupled to the first antenna and to the second antenna, and wherein controlling the wavelength of the signal for transmission comprises switching the switch.

14. The method of claim 13, the method further comprising:
when the switch is in a first position, transmitting the wavelength of the signal for transmission in the first wavelength using the first antenna; and
when the switch is in a second position, transmitting the wavelength of the signal for transmission in the second wavelength using the second antenna.

15. The method of claim 12, the method further comprising:
receiving a control signal indicative of which of the first antenna or the second antenna to transmit from; and
transmitting the signal for transmission using one of the first antenna and the second antenna based on the control signal.

16. The method of claim 12, wherein controlling the wavelength of the signal for transmission comprises:
transmitting the signal for transmission from the first antenna as a V2V signal; and
transmitting the signal for transmission from the second antenna as a V2I signal.

17. The method of claim 12, the controlling, via the matcher, the center of the wavelength of the signal for transmission further comprises shifting the center of the wavelength of the signal for transmission.

18. The method of claim 12, the method further comprising:
determining a signal quality parameter indicative of a quality of a received signal; and
transmitting the signal for transmission using one of the first antenna and the second antenna based on the signal quality parameter.

19. An autonomous vehicle comprising:
a Vehicle to Everything, V2X, antenna comprising:
a first antenna configured to transmit a first wavelength;
a second antenna configured to transmit a second wavelength, the second wavelength being different than the first wavelength; and
a matcher configured to control a center of a wavelength of a signal for transmission;
wherein the V2X antenna is configured to control the wavelength of the signal for transmission using one of the first antenna and the second antenna.

\* \* \* \* \*